(12) United States Patent
DePaulis et al.

(10) Patent No.: US 9,597,763 B2
(45) Date of Patent: Mar. 21, 2017

(54) MODULAR WIRE AND/OR TUBULAR COMPONENT PROCESSING APPARATUS

(75) Inventors: Richard A. DePaulis, Liverpool, NY (US); Marcus W. BeVard, Manlius, NY (US); Kenneth D. Corby, Rochester, NY (US); Paul A. Walker, Victor, NY (US); Matthew F. Humphreys, Deansboro, NY (US); Mark V. Barone, Syracuse, NY (US); David M. Whitehouse, Liverpool, NY (US); John A. Smith, Syracuse, NY (US); Brad G. Leech, Fayetteville, NY (US)

(73) Assignee: The Eraser Company, Inc., Syracuse, NY (US)

( * ) Notice: Subject to any disclaimer, the term of this patent is extended or adjusted under 35 U.S.C. 154(b) by 1280 days.

(21) Appl. No.: 13/469,753

(22) Filed: May 11, 2012

(65) Prior Publication Data
US 2013/0299039 A1 Nov. 14, 2013

(51) Int. Cl.
*B23Q 37/00* (2006.01)
*B23P 23/00* (2006.01)
*B23Q 3/00* (2006.01)
*B23D 21/00* (2006.01)

(52) U.S. Cl.
CPC ............ *B23Q 37/007* (2013.01); *B23P 23/00* (2013.01); *B23Q 37/005* (2013.01); *B23D 21/00* (2013.01); *B23Q 3/00* (2013.01); *Y10T 29/5187* (2015.01); *Y10T 29/5199* (2015.01)

(58) Field of Classification Search
CPC ............... B23Q 37/007; B23Q 37/005; B23Q 2240/007; B23Q 3/00; B23P 23/00; B23D 21/00; B23D 21/04; Y10T 29/5187; Y10T 29/5199; Y10T 29/5116; Y10T 29/5124; Y10T 29/5197
See application file for complete search history.

(56) References Cited

U.S. PATENT DOCUMENTS

| | | | |
|---|---|---|---|
| 4,531,682 A | 7/1985 | Schröder et al. | |
| 4,536,246 A | 8/1985 | McGuire | |
| 4,557,163 A | 12/1985 | Tanner | |
| 4,653,160 A * | 3/1987 | Thorkildsen | H01R 43/052 140/105 |
| 4,858,315 A | 8/1989 | Tanner | |
| 5,153,839 A | 10/1992 | Cross | |
| 5,297,334 A | 3/1994 | Johnson | |
| 5,343,605 A | 9/1994 | Nazerian et al. | |
| 5,865,085 A | 2/1999 | Vollenweider | |
| 6,119,570 A | 9/2000 | Okonski et al. | |
| 6,216,339 B1 * | 4/2001 | Rich | H05K 7/1409 29/267 |
| 6,494,353 B2 | 12/2002 | Small et al. | |
| 6,505,399 B2 | 1/2003 | Lo et al. | |
| 6,637,639 B2 | 10/2003 | Miyoshi et al. | |

(Continued)

*Primary Examiner* — Peter DungBa Vo
*Assistant Examiner* — Jeffrey T Carley
(74) *Attorney, Agent, or Firm* — Barclay Damon, LLP

(57) ABSTRACT

An apparatus for the processing of wire and/or tubular components includes a base member and at least two wire/tube processing modules. The modules can be releasably engaged with each other and the base member in which engagement mechanically and electrically couples the modules and the base member. The base member includes an operator interface enabling operation to any linked module.

7 Claims, 27 Drawing Sheets

(56) References Cited

U.S. PATENT DOCUMENTS

| | | |
|---|---|---|
| 6,921,256 B2 | 7/2005 | Bokich |
| 7,093,638 B2 | 8/2006 | Bonaventura |
| 7,159,306 B2 | 1/2007 | Schilson et al. |
| 7,243,429 B2 | 7/2007 | Landes et al. |
| 7,243,516 B2 | 7/2007 | Zusi |
| 7,310,983 B2 | 12/2007 | Schill et al. |
| 7,454,944 B2 | 11/2008 | Schill et al. |
| 2002/0092899 A1 | 7/2002 | Miyoshi et al. |
| 2003/0004594 A1 | 1/2003 | Liu et al. |
| 2004/0118100 A1 | 6/2004 | Liao |
| 2005/0055822 A1* | 3/2005 | Locher .................. H01R 43/05 29/564.4 |
| 2006/0040815 A1 | 2/2006 | Wied et al. |
| 2007/0294873 A1 | 12/2007 | Bogursky et al. |
| 2009/0126181 A1 | 5/2009 | Locher et al. |
| 2010/0006082 A1 | 1/2010 | Glinski et al. |
| 2010/0187204 A1 | 7/2010 | Angelella et al. |

\* cited by examiner

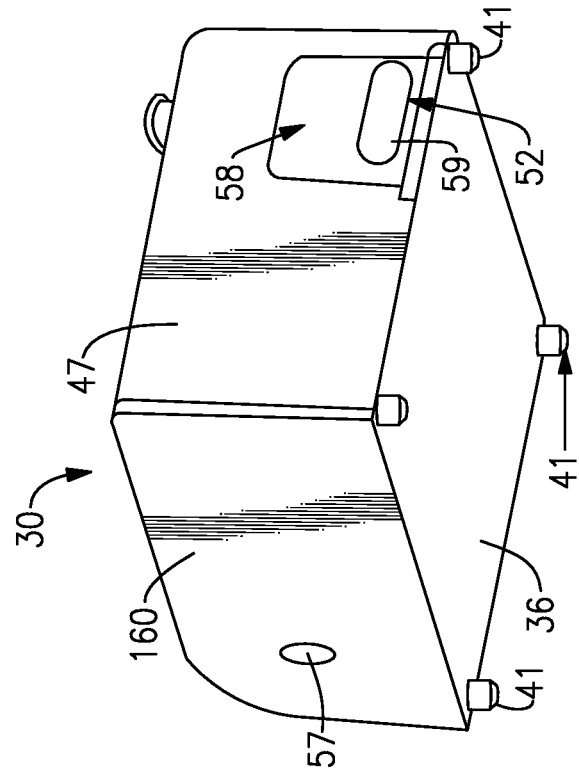
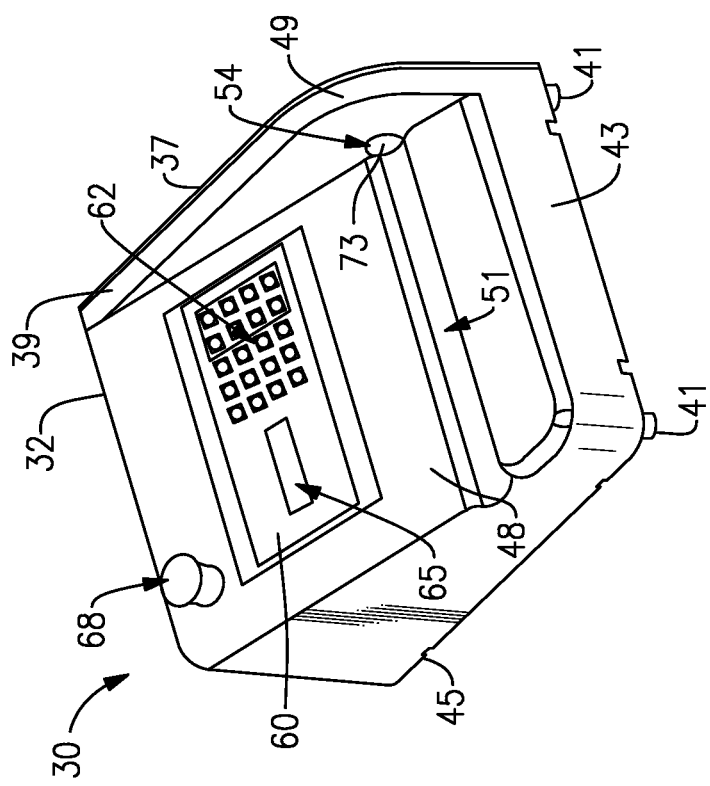

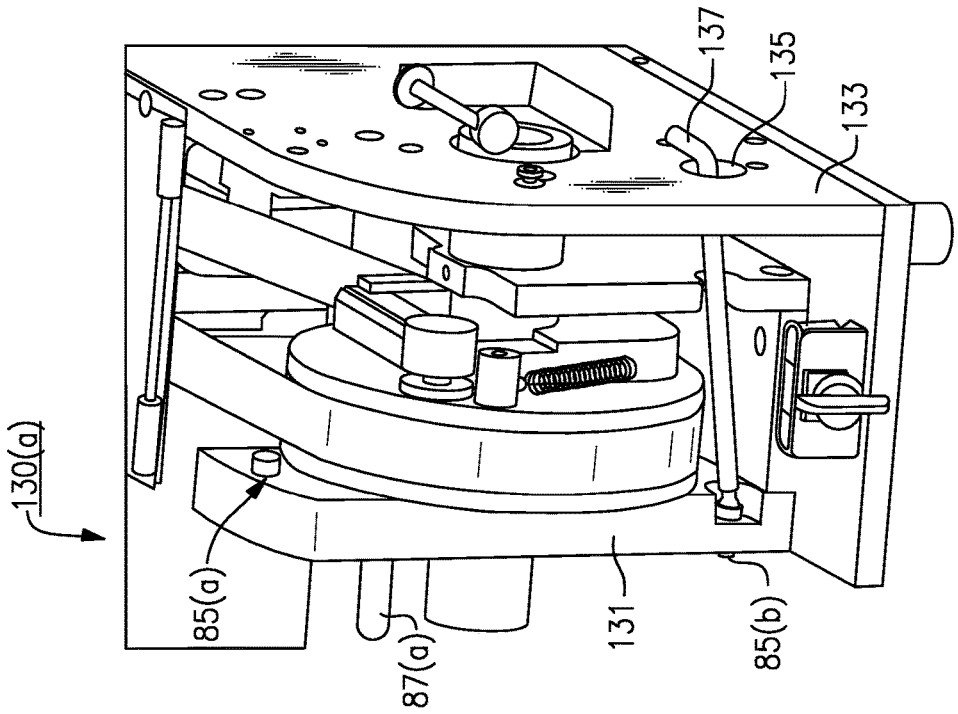
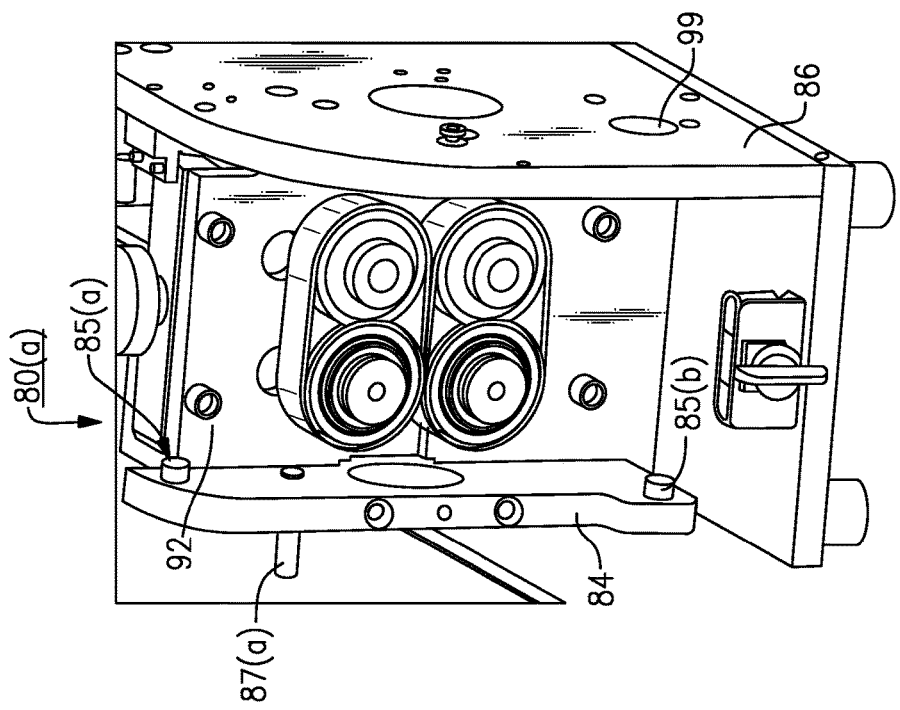

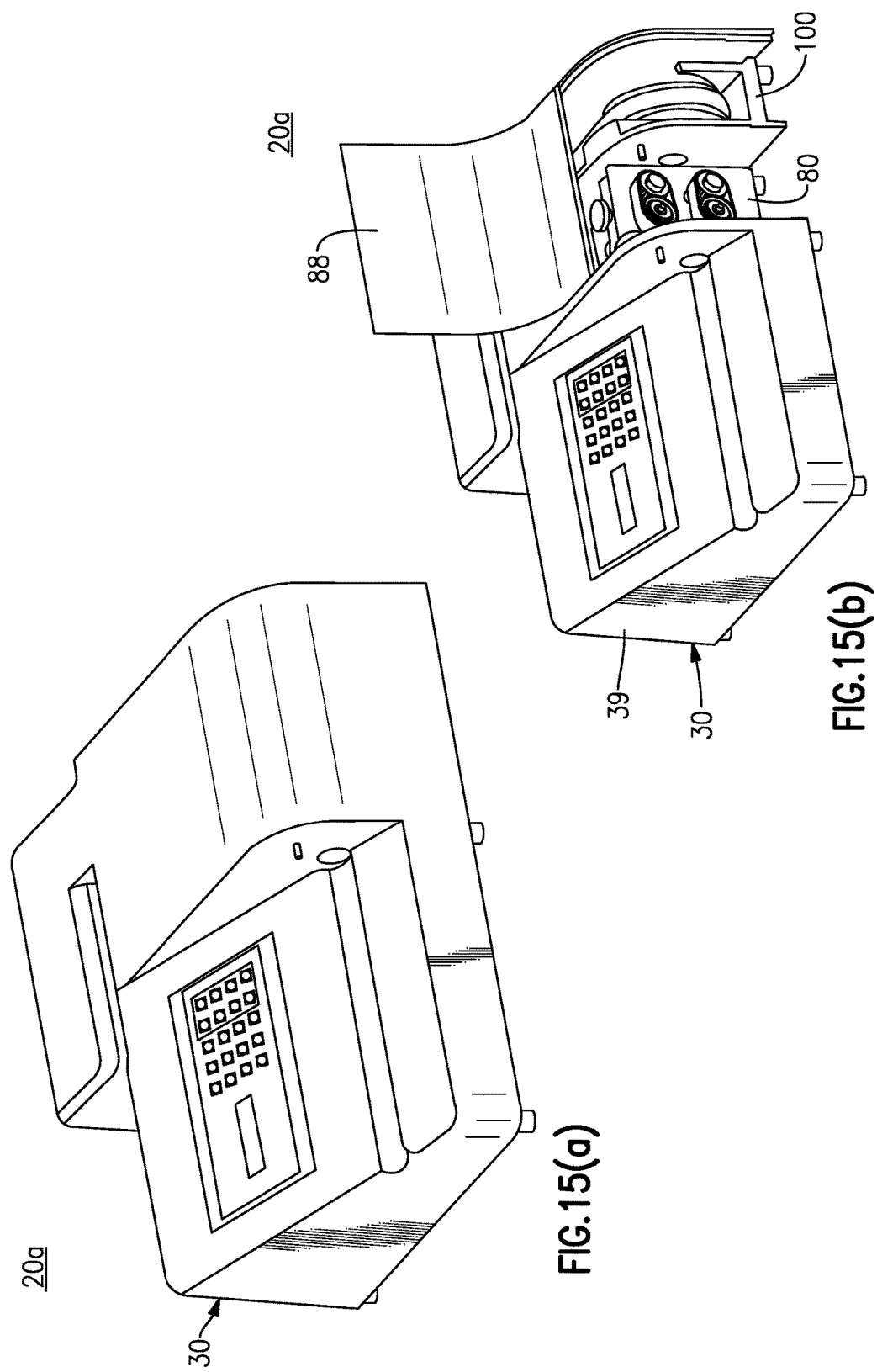

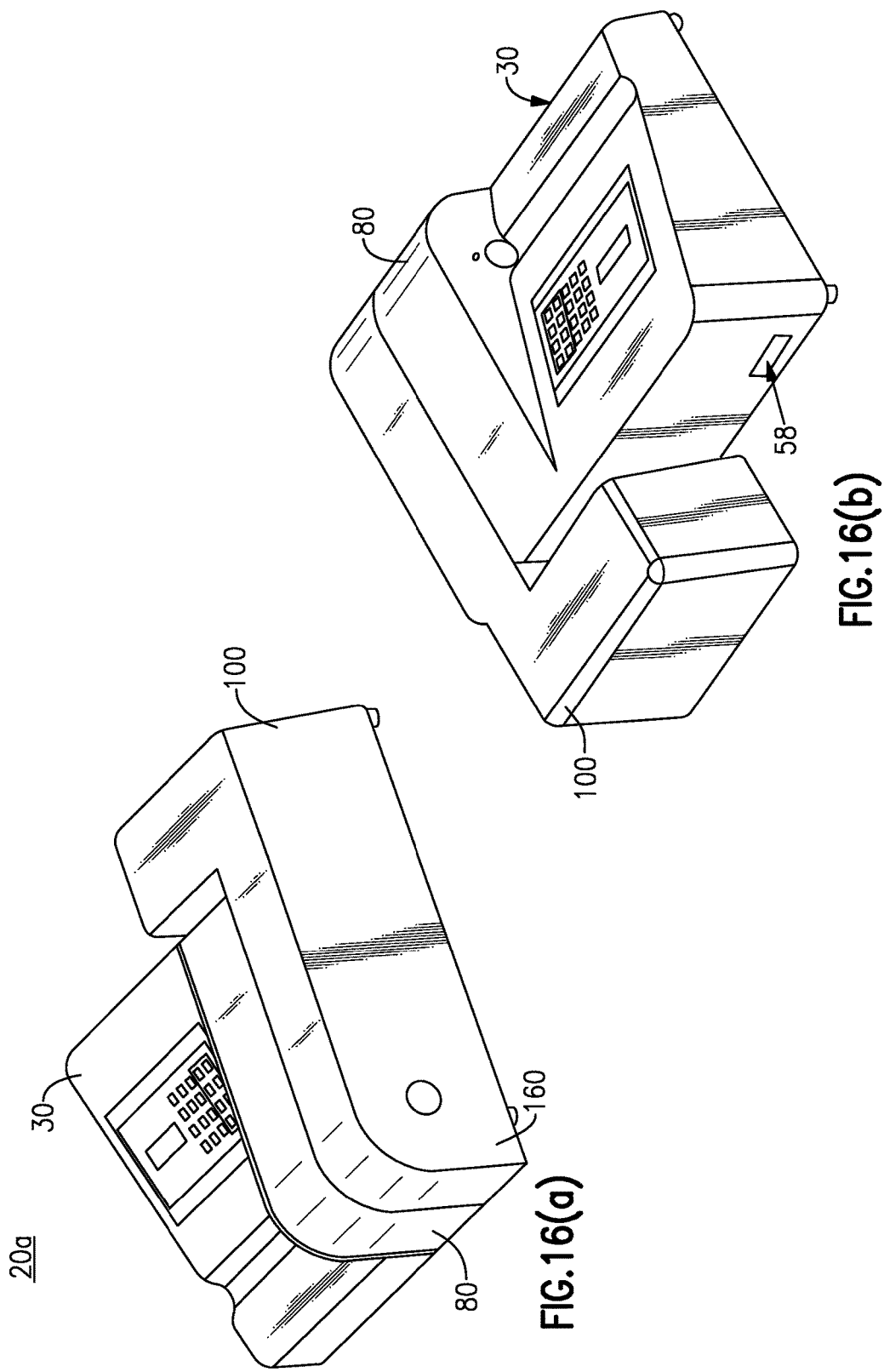

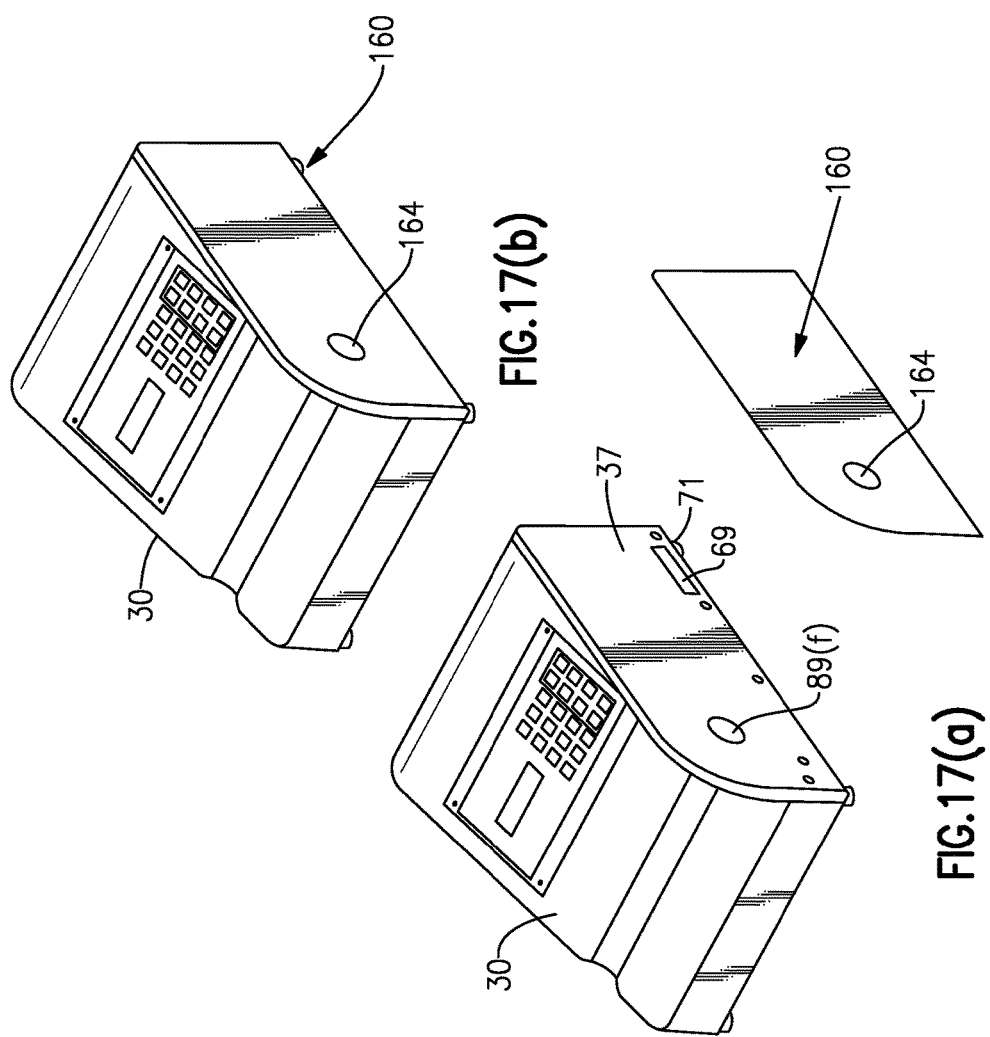

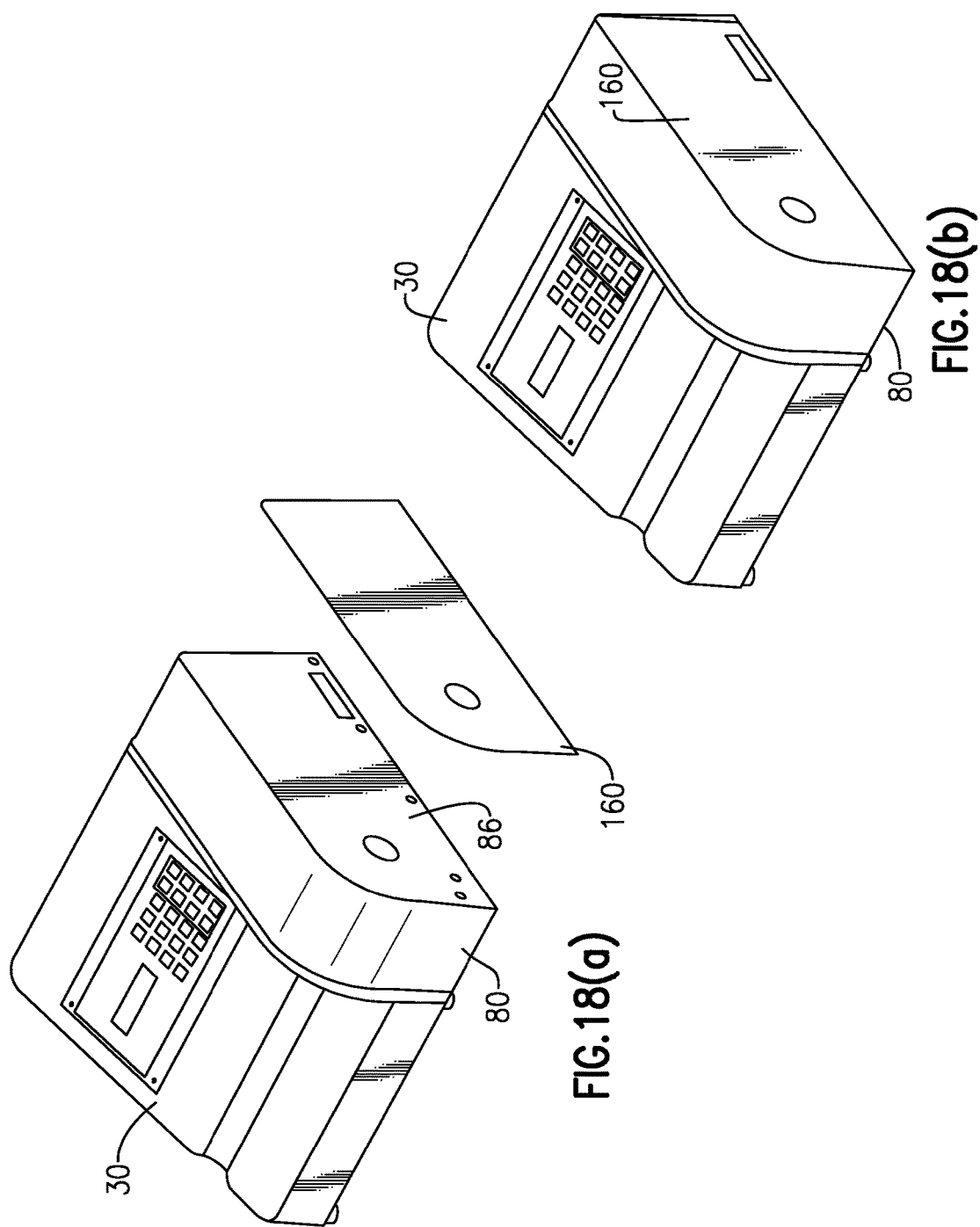

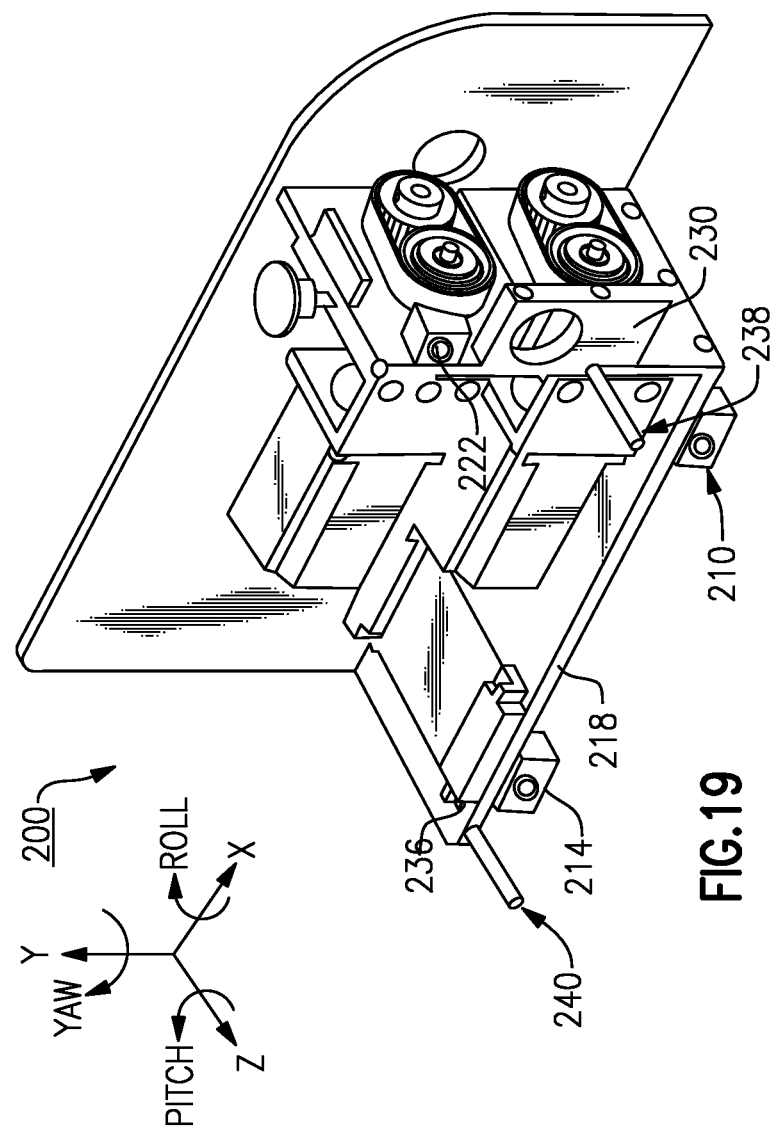

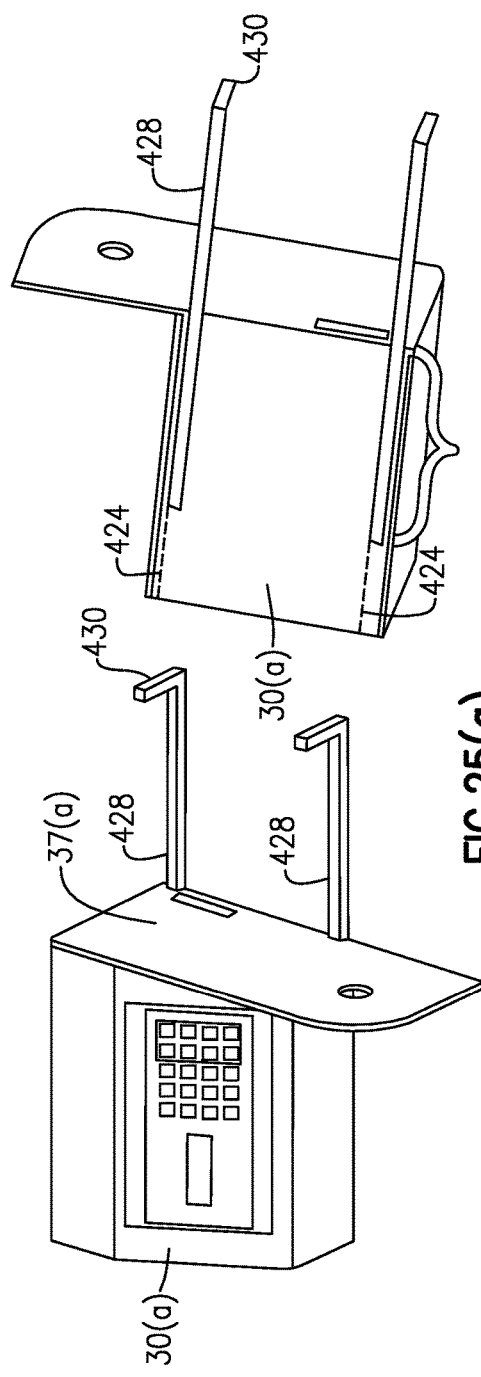
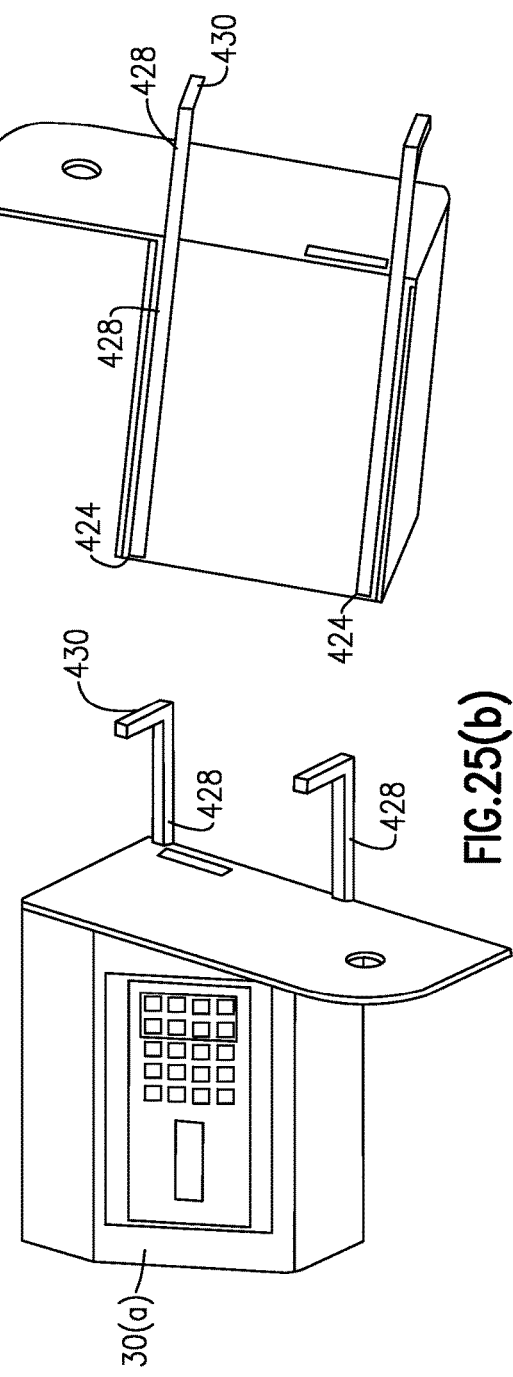
FIG.25(a)
FIG.25(b)

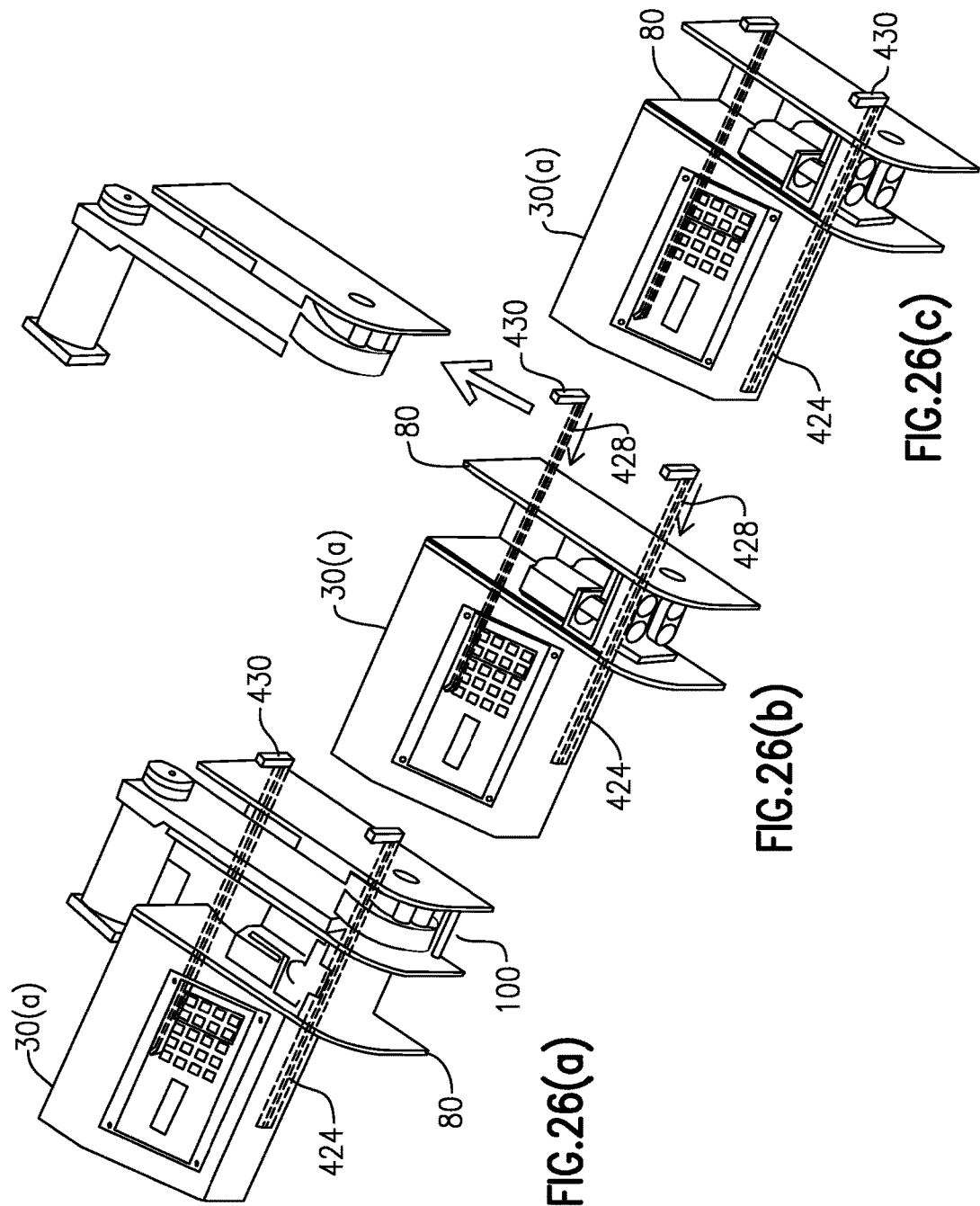

MODULAR WIRE AND/OR TUBULAR COMPONENT PROCESSING APPARATUS

TECHNICAL FIELD

The subject matter discussed herein is generally directed to the field of component manufacturing/processing and more specifically to a wire or tubular component processing apparatus having a plurality of separate and interchangeable modular assemblies.

BACKGROUND

Numerous assemblies are presently known and commercially available in the field of wire or tube handling, processing and manufacture for a number of varied applications, including, for example, those pertaining to the medical, industrial and other fields. Some of these processing assemblies are designed to permit processing of wires and/or tubular components covering fairly wide ranges of wire or tube sizes (diameters). Generally, however, these assemblies are dedicated to a particular field or application. As a result, these assemblies are incapable of expansion beyond their existing processing capability or for enabling replaceability of even portions of the assembly, such as to enable use for different applications or fields.

Therefore, there is at least general need in the field to provide a more versatile wire or tubular component processing apparatus than those that are presently available in order to provide and enable expandability and functionality, as well as making such apparatus readily adaptable for use in multiple fields and/or applications.

SUMMARY

According to a first aspect, there is provided a modular apparatus for the processing of wire and/or tubular components. According to one version, the apparatus comprises a base member defined by a housing and having a controller contained therein, as well as an accessible operator's interface. At least two wire/tube processing modules are mechanically and electrically couplable to the base member and/or each other in releasable fashion and made functionally operable using said operator's interface.

In one embodiment, at least one of the wire/tubular component processing modules comprises a cutting assembly, such as a so-called "guillotine" cutter and/or belt-driven wheel cutter. In another version, at least one wire/tubular component processing module comprises a feeding assembly. In one embodiment, at least one of the cutting assemblies can be separably coupled to either the base member or another wire/tubular component processing module, thereby enabling replacement depending, for example, on the type of product being handled or the application for which the wire/tube product is ultimately utilized. Preferably, the base member and each of the separate modules include processing logic that is integrated upon their connection to permit overall operation of the apparatus. The base member is further configured to provide electrical power to each of the various processing modules upon connection, and in which operation of all attached components is coordinated via the operator interface.

Using the herein defined apparatus, a plurality of wire or tubular component processing modules having different functionalities can be interchangeably linked with the base member and each other. For example, a wire feeder module can be releasably coupled to the base member with at least one cutting assembly/module being releasably and sequentially coupled to the wire feeding module. An integrated assembly is therefore created, the assembled components further defining a singular product path.

According to one version, each of the interchangeable wire or tubular component processing modules include a set of laterally extending engagement pins that are sized and aligned to engage with corresponding engagement openings formed either in a mating processing module or the base member. A series of mechanical fasteners interconnect the two modules in which the engagement pins and the connectors coact to provide exact constraint of the assemblage in terms of all six degrees of freedom, including pitch, roll and yaw. In addition, each the base member and processing module(s) further include mating electrical connectors to provide electrical couplability between the processor of the base member and processing logic provided in each attached module such that both mechanical and electrical engagement therebetween is effectively realized.

Alternatively, the processing modules can be interconnected with the base member and each other using at least one fastener that is vertically mounted through an extending portion of the base plate of one of the components and engaged with a slotted keyway of the adjacent component. Upon lateral engagement of the mating base plates, the at least one fastener can be secured, thereby retaining the assembly.

In accordance with yet another version, a rail-like supporting structure can be provided wherein a predetermined number of processing modules can be disposed between a pair of parallel supporting rails laterally extending from the base member, the rails having an end support. In one version, the rails can be retracted so as to vary the number of modules supported.

According to another aspect, there is provided a modular wire or tubular component feeding/cutting apparatus comprising a base member having a housing and an operator's interface, and at least two wire or tubular component processing modules. Each of the wire or tubular component processing modules include a module housing that is interchangeably and releasably couplable to one another and the housing of the base member to selectively provide various processing assembly configurations.

The base member includes a processor, as well as a externally disposed electrical connector that mates with a corresponding electrical connector of a connected processing module. Each of the processing modules include processing logic that is integrated with that of the base member when connected, as well as a pair of electrical connectors disposed on opposing walls to enable serial connectivity between the base member and a plurality of modules. The processing logic of each connected processing module is integrated and coordinated, irrespective of the ordering of any of the assembled modules.

In one version, the base member and each of the wire/tubular component processing modules are mechanically linked using a series of fasteners as well as a corresponding set of engagement pins laterally extending from the housing of either the base member or a processing module that engages with corresponding openings formed in the other of the base member and processing module. The engagement pins and fasteners coact to provide exact constraint between adjacent interconnected modules of the assembly in all six degrees of freedom including pitch, roll and yaw. Connectivity can be provided according to this version to enable stable, but releasable engagement between the base member and a first processing module as well as between the first processing module and subsequent processing modules. In addition, the first processing module includes an electrical connector for permitting attachment with a corresponding electrical connector provided in an adjacent processing module. In one version, the engagement pins are designed with a longer length such that the engagement pins are first received, followed by the captured fasteners to provide initial alignment and better enable mechanical interconnection. As a result, the electrical connectors are also properly aligned for connection therebetween. As noted and when attached, the processing logic contained in each processing module is seamlessly integrated with that of the base member, enabling operation of the entire composite assembly as though it were initially merged as a single unit, the assembly further defining a single product path.

According to another version and in lieu of captured fasteners, the base member and processing modules can be interconnected using at least one fastener engaged with a base plate of either the base member or a processing module. The at least one fastener is engageable with a slotted keyway formed on one of the modules and interlocked by advancing the at least one fastener into the slotted keyway, sliding the plates and then securing the at least one fastener to each of the mated plates. According to yet another version, the processing modules can be selectively arranged upon a rail-like retaining structure disposed in relation to the base member, the retaining structure including a set of retractable lateral rails and an end support, enabling a plurality of processing modules to be selectively interconnected therein.

According to yet another aspect, there is described a method for manufacturing a modular wire/tubular component processing assembly, said method comprising the steps of:

manufacturing a base member, said base member including an operator's interface and a processor; and manufacturing a plurality of discrete wire/tubular component processing modules, each module having an individual module processor, each of said processing modules being configured for releasable interchangeable attachment to at least one of said base member and each other wherein mechanical attachment also provides electrical attachment therebetween, enabling each of said wire/tubular component processing modules to be operated from the operator's interface of said base member.

According to at least one version, the base member and at least one of the processing modules includes a set of engagement openings that are appropriately sized to receive respective engagement pins and fasteners extending laterally from one of the wire/tubular component processing modules. The engagement pins and fasteners coact to provide exact constraint between the connected modules and enable initial alignment using the engagement pins prior to mechanical engagement. In addition, electrical connectors linked to the processors of each of the base member and processing modules are further provided, preferably on each mating wall to adequately power each connected module. The attached processing module includes an opposing side wall having a similar set of engagement openings and an electrical connector for receiving another processing module. As such and according to this version, subsequent processing modules can be serially and independently arranged based on need or application to perform a wire or tubular component processing operation. When attached, each of the processors of the modules are harmoniously linked and through the established connection, powered through the base member and controlled using a single operator interface.

Alternatively, the processing modules can be releasably interconnected to one another and the base member using a key/keyway interface between modules or by use of a rail-like supporting structure.

One immediate advantage that is realized from the herein described wire or tubular component processing apparatus is improved versatility in that any number of wire/tubular component processing assemblies can be selectively and independently added and/or removed from to the apparatus without significant modification.

Another advantage provided using the herein described processing apparatus is that a myriad of different or varied applications can be accommodated. For example, the apparatus can easily be adapted by interchanging various processing modules as needed to provide more or less functionality, enable different product options (small or large diameter wire or tubing), and different end uses of the resulting product (i.e., electrical wire, medical grade tubing, etc.).

Yet another advantage provided herewith is that an overall manufacturing assembly, as described herein, can be easily torn down for transport or movement of one or more modular components to another location, thereby providing additional versatility as well as mobility.

Still further and according to this concept, a customer can set up a single work bench with one modular system. In this variable setup, a single location/site is all that is required as well as a single stock stand, windup stand or basket to receive all products handled from this single location. As a result, overhead and manufacturing costs are significantly reduced.

The herein defined modular assembly is thereby enabled for both manual operation using simply a base member and a feeder module or automatic operation using a plurality of interconnected modules depending on the volume required or other manufacturing conditions.

These and other features and advantages will become readily apparent from the following Detailed Description, which should be read in conjunction with the accompanying drawings.

BRIEF DESCRIPTION OF THE DRAWINGS

FIGS. 3(a) and 3(b) are front and rear perspective views of a base member of the modular wire or tubular component processing apparatus depicted in FIGS. 1 and 2;

FIGS. 14(a) and 14(b) are partially broken away views of the wire feeder and wheel cutter modules, depicting accessibility in regard to the captured fasteners used to mount the modules in the assembly;

FIGS. 15(a) and 15(b) are front perspective views of another configuration of the wire or tubular component processing assembly, shown with a cover closed and open, respectively;

FIGS. 16(a) and 16(b) are side perspective views, 180 degrees apart, of a wire or tubular component processing apparatus in accordance with another configuration;

FIG. 17(a) and FIG. 17(b) depict perspective views of a modular wire or tube processing apparatus including an end plate or cover in accordance with an exemplary embodiment;

FIG. 18(a) and FIG. 18(b) depict perspective views of a modular wire or tube processing apparatus including an end plate or cover in accordance with another embodiment;

FIG. 19 is a partially broken away side perspective view of a processing module having a mechanical interface made in accordance with another exemplary embodiment;

FIGS. 25(a) and 25(b) illustrate top and bottom perspective views of a portion of a processing apparatus, including an adjustable module retaining structure in accordance with two exemplary embodiments;

FIGS. 26(a)-(c) are top perspective views of the processing apparatus of FIG. 25, illustrating use of the module retaining structure.

DETAILED DESCRIPTION

The following description relates to certain exemplary embodiments of a modular wire and/or tubular component processing apparatus or assembly. It should further be noted that the embodiments described herein are mere examples of the nearly limitless number of combinations, configurations and arrangements that are possible in accordance with the herein described concepts. It will also be readily apparent to those of sufficient skill that the present apparatus and methodology can be suitably employed for use in an a varied number of fields and applications that utilize wire and/or tubular components. Throughout the course of discussion that follows, various terms are used in order to provide a suitable frame of reference with regard to the accompanying drawings such as, for example, "upper", "lower", "bottom", "top", "side", "lateral", "upstream", "downstream", "vertical", "horizontal", "inner", "outer" and the like. It is not intended, however unless specifically indicated, that these terms should be narrowly interpreted so as to be overly restrictive of the teachings of the inventive concepts, including the claims.

Furthermore, it should be noted that the accompanying drawings merely provide context as to the present apparatus in order to convey the overall scope of the present invention. To that end, these drawings are not necessarily to scale and therefore should not be interpreted in terms of their overall dimensioning, as they are presently depicted.

Figure 1:
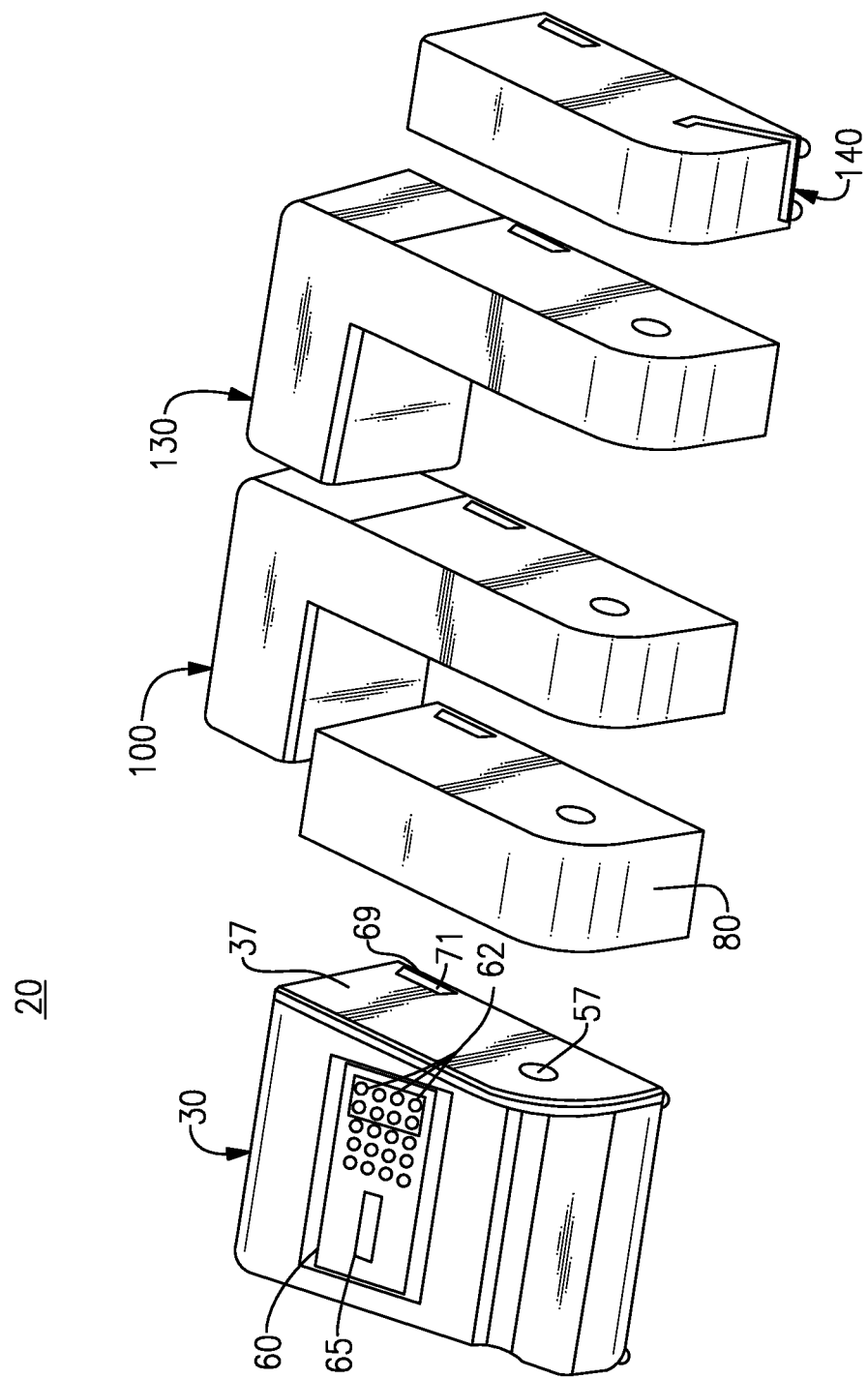
FIG. 1 is an exploded assembly view of a modular wire or tubular component processing apparatus according to an exemplary embodiment.
Figure 2:
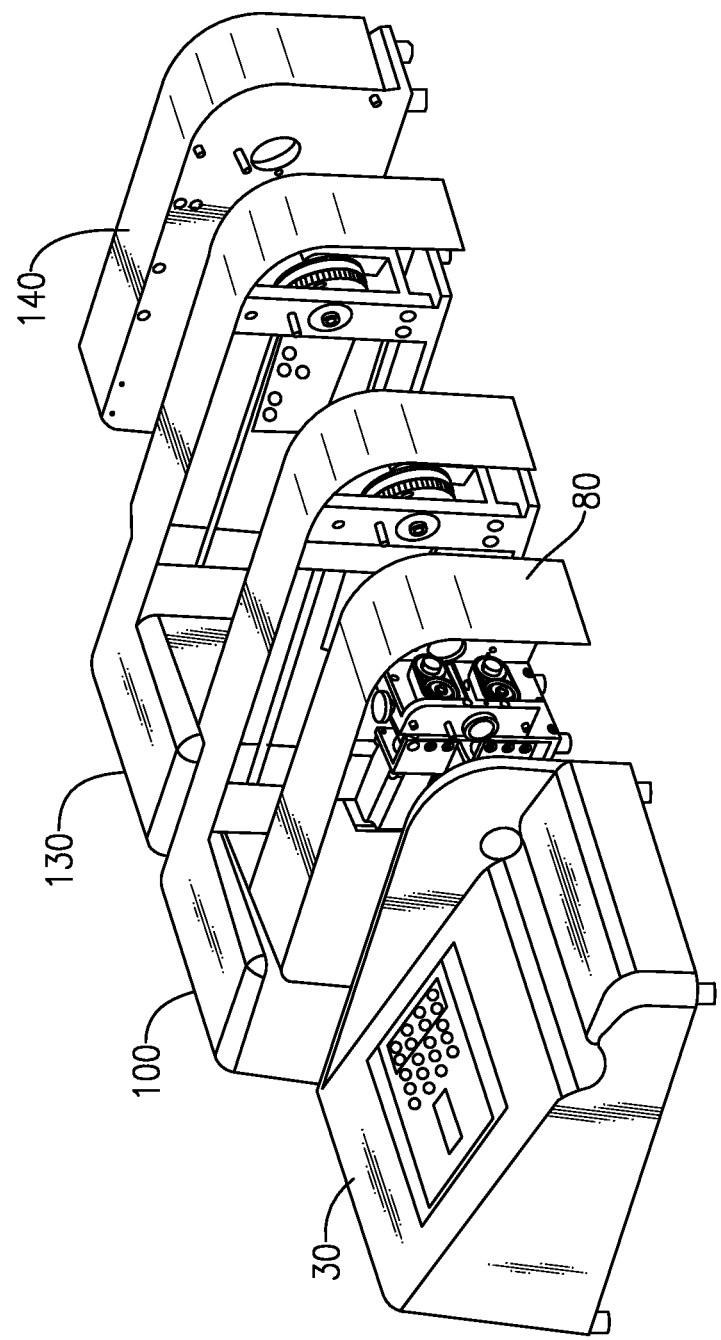
FIG. 2 is a partial front perspective view of the exploded modular wire or tube processing apparatus of FIG. 1.

Referring to FIGS. 1 and 2, there is shown a first embodiment of a modular wire or tubular component processing apparatus, herein referenced throughout this description as reference numeral 20. Generally and as described herein, a plurality of individual wire or tubular component processing modules can be interchangeably and releasably connected together relative to a single base member 30. According to the specific exemplary version that is depicted in FIG. 1, four (4) respective wire or tubular component processing modules 80, 100, 130 and 140 can be serially attached to the base member 30 and to each other.

According to this specific embodiment and as discussed in greater detail herein, a first wire or tubular component processing module 80 is a wire feeding assembly and an adjacent second wire/tubular component processing module 100 is a wire or tubular component cutting apparatus. Each of the third and fourth wire/tubular component processing modules 130, 140 shown according to this example are alternative forms of wire or tubular component cutting assemblies that can be used to either replace or supplement portions of or the entire preceding arrangement. It will be apparent that the processing modules specifically described herein are merely examples. For example, other various discrete wire or tubular component processing modules that enable marking, splicing, crimping, coating, reeling, coating removal and other suitable applications on either wire or tubular components that could be performed serially, as needed, can also or alternatively be added to the apparatus 20, depending, for example, on the application and/or field of use. It will also be readily apparent, based on the following discussion, that other types of wire and/or tubular component processing modules can be provided and/or added to either supplement or replace existing modules.

As described herein, each of the processing modules 80, 100, 130, 140, when assembled, are cooperatively engaged so as to functionally perform as though integral to the apparatus 20. Specifics relating to the base member 30 are herein first provided, followed by brief descriptions of each of the exemplary wire and/or tubular component processing modules 80, 100, 130, 140.

Figure 5:
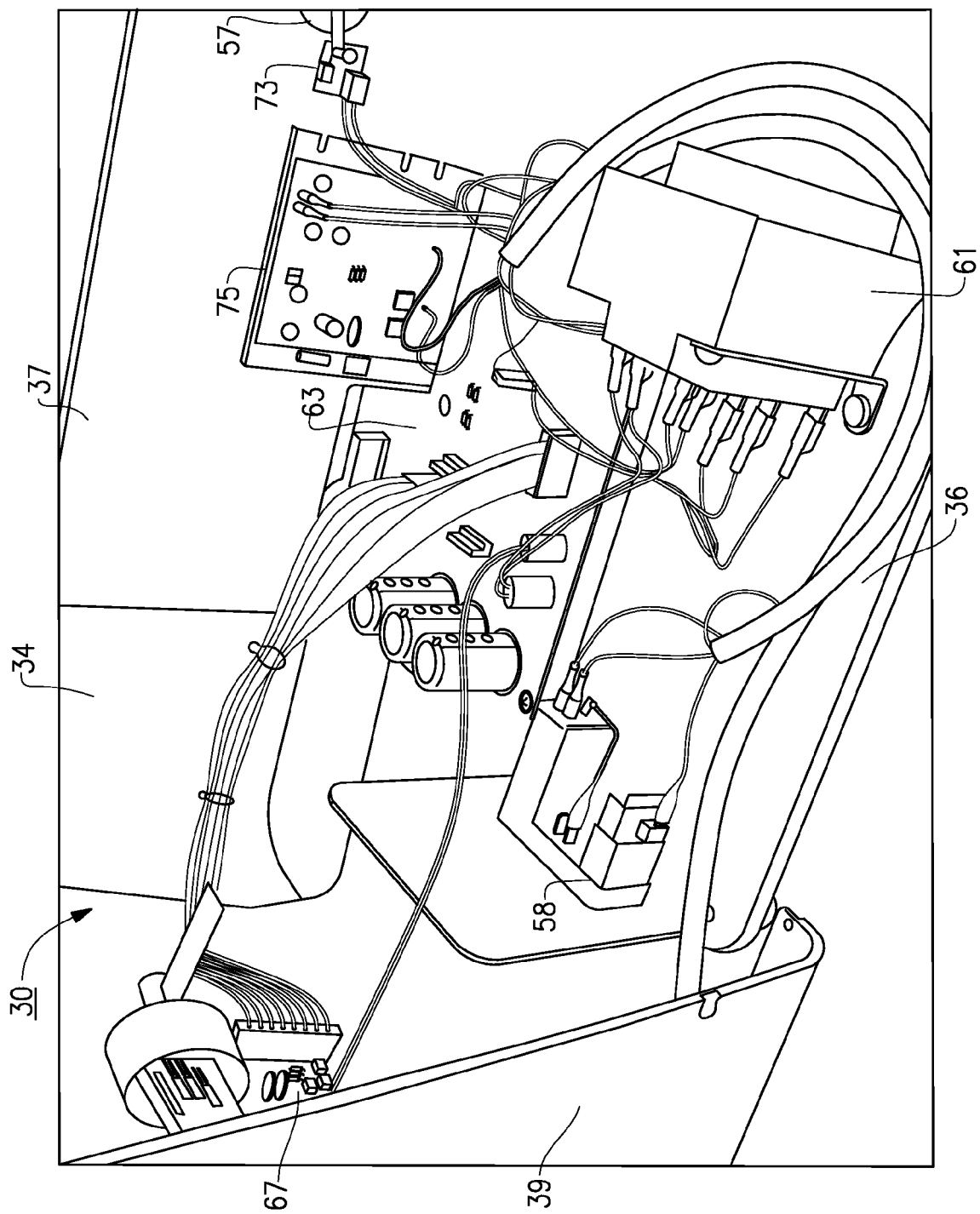
FIG. 5 is—a partially broken away view of the interior of the base member of FIGS. 3(a)-4.

Referring to FIGS. 3(a) and 3(b), the base member 30 according to this embodiment is defined by a compact housing 32 that is fabricated from steel or other suitable structural material, including a substantially hollow interior 34, FIG. 5, that is appropriately sized to retain a plurality of components, as discussed herein. Structurally, the housing 32 further includes a lower base or supporting plate 36, an interface wall 37, as well as a cover 39. The bottom side of the base or supporting plate 36 includes a set of rubberized feet 41, disposed at respective corners of the supporting plate, enabling the base member 30 to be stably positioned upon a work surface (not shown).

The cover 39 according to this exemplary embodiment creates a enclosure that defines the hollow interior 34, FIG. 5, of the base member 30, the cover including a front facing wall 43, a first side wall 45, a rear wall 47 and a top surface 48. The first side wall 45, front facing wall 43 and top surface 48 of the cover 39 each define a tapered configuration in which the front wall 43 and rear wall 47 are substantially planar and wherein the height of the first side wall 45 and top surface 48 tapers upwardly between the front wall and the rear wall to define a substantially trapezoidal-shaped configuration. The cover 39 further includes a second side wall 49 opposite the first side wall 45, the second side wall being recessed and extending upwardly as an extension to cover the interface wall 37, FIG. 1, and provide engagement therewith. The defined recess (not shown) provides a small gap between the interface wall 37 and the second side wall 49 above the tapered sections of the cover 39, wherein the portions below each of the tapered sections are open-ended according to this embodiment. When assembled as shown, the cover 39 engages the supporting or base plate 36 and the interface wall 37 of the base member 30 and is fixedly attached by use of a series of threaded fasteners (not shown) to the supporting plate 36 and the interface wall 37. According to at least one version, a separate end plate 160, FIG. 3(b), is used to cover the exposed interface wall 37 prior to assembling any of the processing modules of the apparatus 20. This end plate 160, which is removed at the time of assembly, is further described in a subsequent portion of this application.

In the assembled position, an alignment trough 51 is provided along a lower portion of a top surface 48 of the cover 39, the trough extending from the first side wall 45 through an opening 54 provided in the extending portion of the second side wall 49 of the cover 39, and providing a path for wire or tubular material (product) extending through the interface wall 37 that is similarly provided with an aligned opening 57.

As shown in FIGS. 3(b) and 5, the rear wall 47 of the cover 39 includes a power entry module 58 having a port 59 for receiving external electrical power, such as from an AC supply (not shown), as well as including an exteriorly accessible and actuable operating switch 52 and a fuse (not shown).

Referring back to FIG. 3(a), the top surface 48 of the cover 39 further retains an operator's or user's interface 60, this interface including a control panel having a series of actuable control buttons 62, as well as a resident display 65. As discussed herein, this interface 60 is used to enable a user to program a sequence that cooperatively enables each and any of the processing modules 80, 100, 130, 140 that are releasably connected as part of the apparatus 20.

An emergency stop button 68 is additionally disposed on the top surface 48 of the cover 39 adjacent to the user interface 60. Depression of the emergency stop button 60 immediately cuts off external power to the apparatus 20, including any interconnected processing module.

Figure 4:
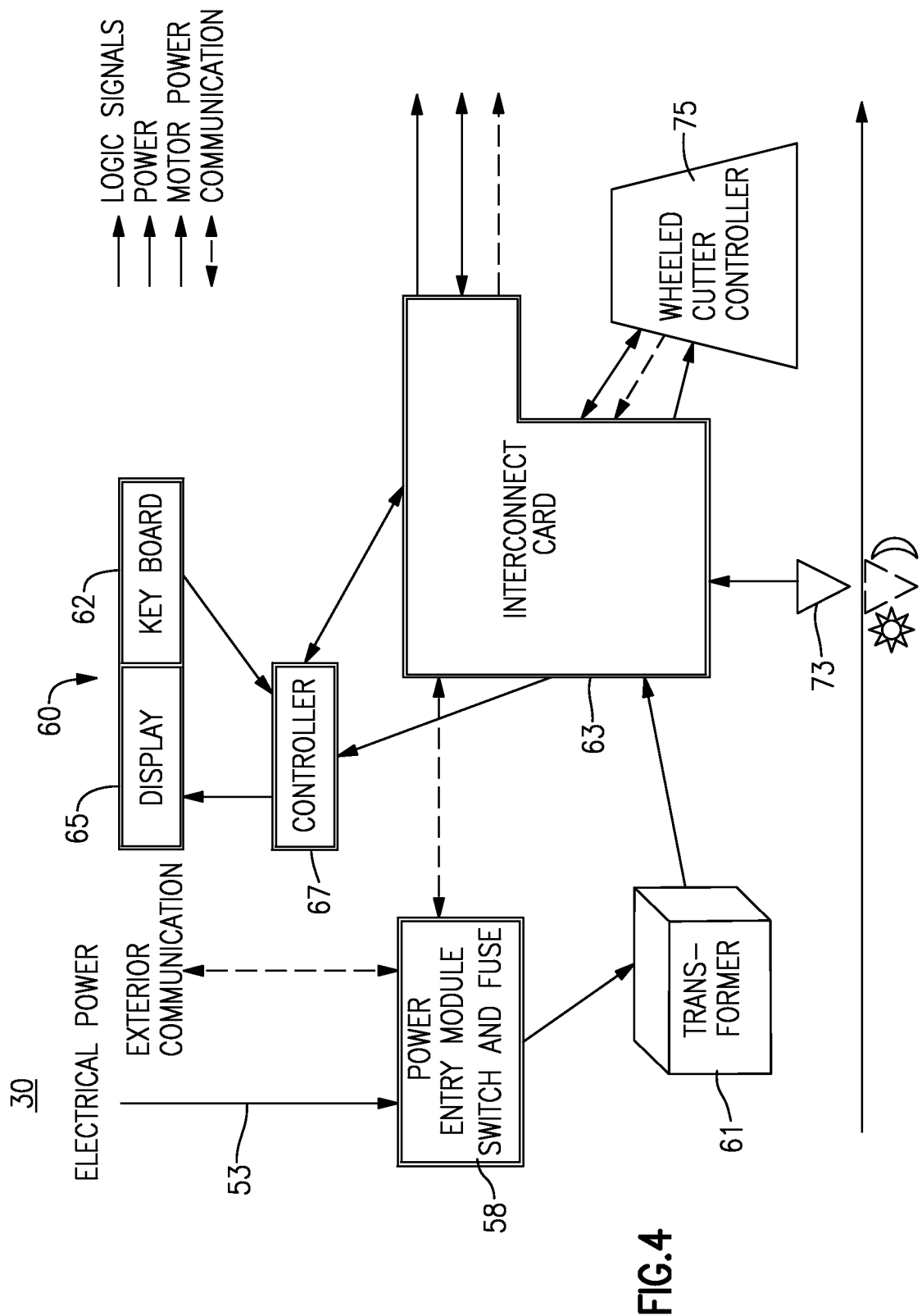
FIG. 4 is a functional schematic diagram of the base member of FIGS. 3(a) and 3(b)

Turning now to FIG. 4, a schematic diagram is provided regarding the active components of the base member 30, including those contained within the defined hollow interior 34, FIG. 5. The components themselves are also depicted in the broken away view at FIG. 5, which is also herein referred to for purposes of describing the base member 30 according to this exemplary embodiment. First, electrical power is provided as shown by reference arrow 53 from an external AC source (not shown) that is received through the port 59, FIG. 3(b), of the power entry module 58, which as previously noted includes an exterior accessible switch 52 for selectively powering the base member 30, as well as a fuse (not shown). The power entry module 58 is connected to an AC transformer 61, enabling power to be provided to the components of the base member 30 and as discussed herein, each of the connected processing modules 80, 100, 130, 140 of the herein described apparatus 20.

Figure 8:
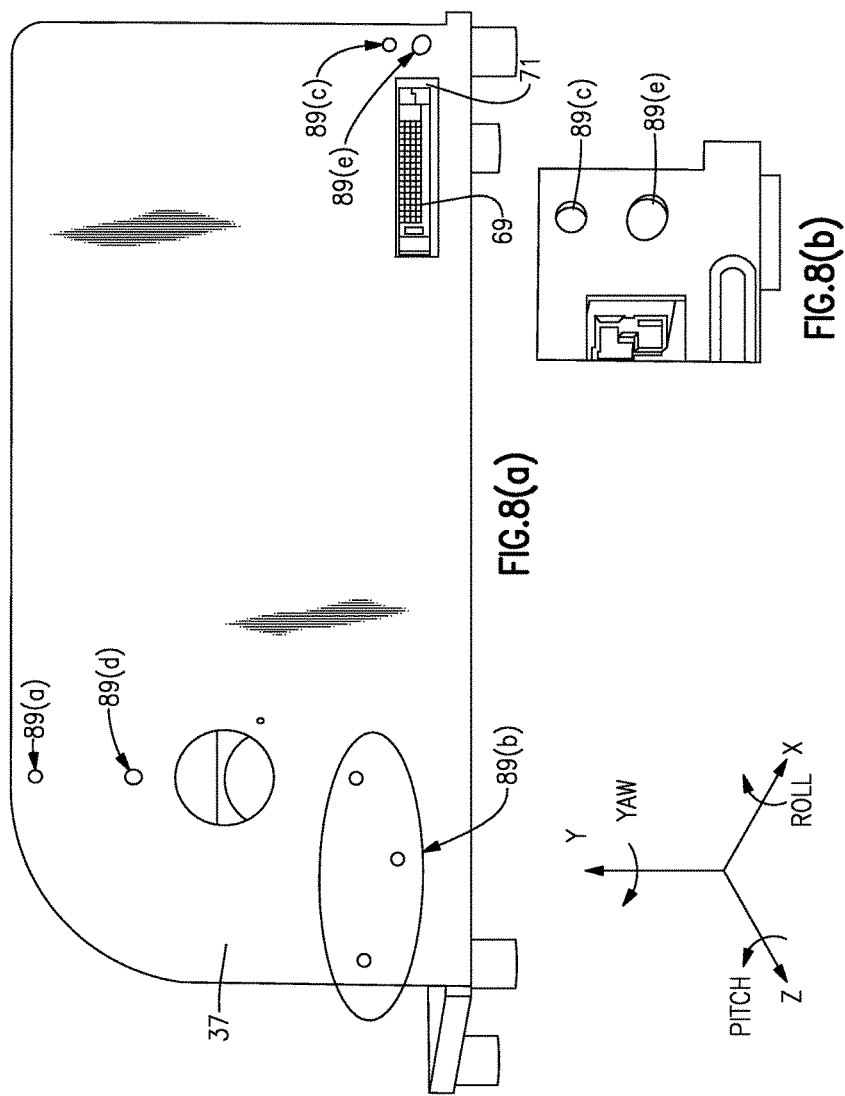
FIG. 8 depicts the upstream side plate of the base module for connection to a downstream wire or tubular component processing module.

Each of the foregoing components are linked to a processor, which according to this embodiment is disposed within the interior 34, FIG. 5, of the base member 30 in the form of a printed circuit (IC) board (hereinafter referred to throughout this discussion as an "interconnect card" 63), the card having sufficient processing logic and circuitry for controlling the contained components. The interconnect card 63 is further linked to an interface controller 67 that is further interconnected to the keyboard 62 and display 65 of the user interface 60. As shown in FIGS. 1 and 8(a), a pinned electrical connector 69 is accessible through an elongated slot 71 provided in the interface wall 37. The connector 69 is linked to the interconnect card 63 and provides a conduit for purposes of conveyance of various logic and communication signals, as well as electrical power. According to this embodiment, a motor controller 75 is also provided for purposes of controlling a drive motor of the one of the processing modules 100, 130 or 140, as discussed herein, the controller being directly linked to the interconnect card 63 and the AC transformer 61. An out of stock sensor 73 disposed along the defined product path and in relation to the opening 57 is also linked to the interconnect card 63.

The interface wall 37 is fixedly attached to one side (hereinafter referred to for purposes of this description as the "downstream side") of the housing 32 of the base member 30 by means such as welding or use of fasteners, such as retaining bolts, the wall extending upwardly (i.e., vertically) relative to the base or supporting plate 36.

Each of the interchangeable wire and/or tubular component processing modules 80, 100, 130, and 140 are described herein in the following sections. Generally and though each of the processing modules 80, 100, 130, 140 contain different components for purposes of performing disparate functions or otherwise performing similar functions in an alternative manner, these modules also possess certain common structural features for purposes of their interconnectivity and interchangeability. Discussion is first made specifically to the first processing module 80, in which any common features are specifically noted, including those relating to connectivity.

Figure 6:
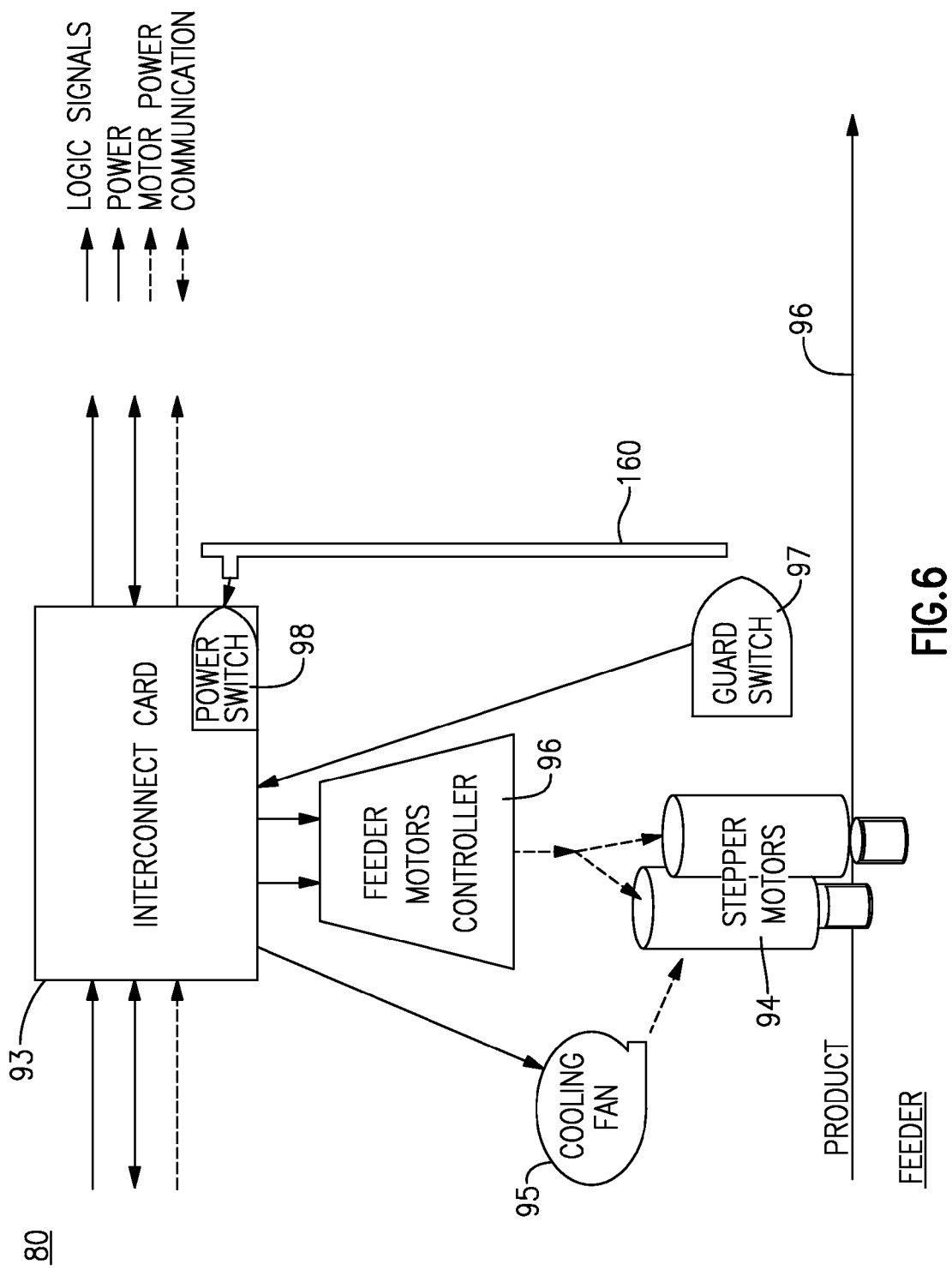
FIG. 6 is a functional schematic diagram of a first wire processing module used in the apparatus of FIGS. 1-5.
Figure 7:
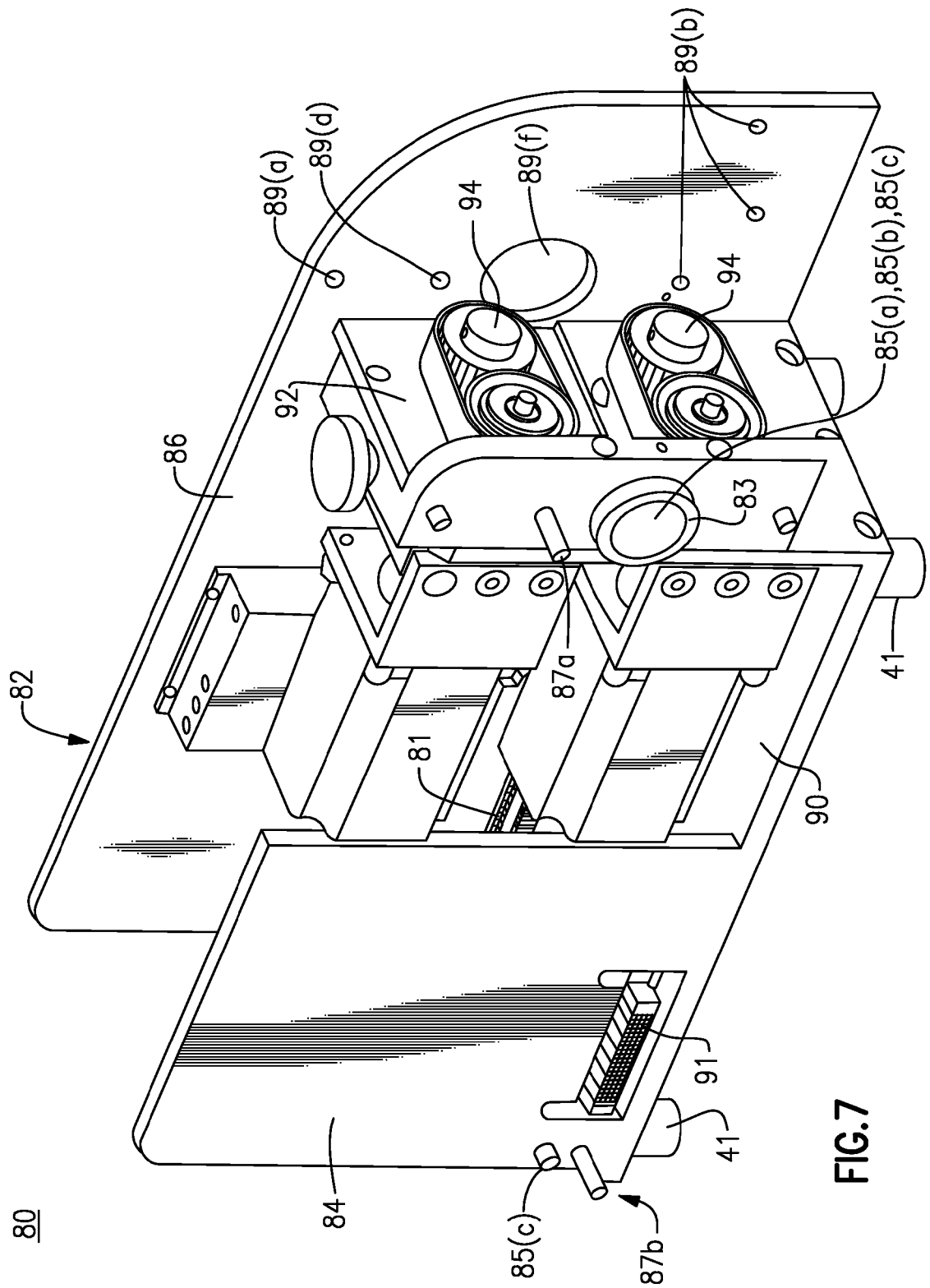
FIG. 7 is a side perspective view, partially broken away, of the wire processing module of FIG. 6.

Referring to FIGS. 6 and 7, and for purposes of this exemplary embodiment, the first wire processing module 80 is a wire feeding assembly or module. A housing 82 for this processing module 80 is defined by first and second opposing side walls 84, 86, a top cover 88, FIG. 15(b), as well as a base or supporting plate 90 (partially shown) that is disposed between the opposing side walls. The side wall 84 of this module according to this particular embodiment is split into a front side wall 84(a) and a rear side wall 84(b), the former being connected to a feeder frame or assembly 92. Like the base member 30, the supporting plate 90 includes a bottom surface having a set of support feet 41 disposed at respective corners. When engaged with the base member 30 as shown, for example in FIG. 2, the base plate 90 of this processing module 80 is substantially planar with the supporting plate 36 of the base member 30.

As noted above and for purposes of providing a frame of reference in terms of interconnectivity between the various components, the first processing module 80 and the base member 30 are each defined by an "upstream" side as well as an opposing "downstream" side or end. More specifically and in terms of engagement/connectivity according to this embodiment, the upstream side of the processing module 80 is engageable with the downstream side of the base member 30 or the downstream side of another processing module. Aspects of the attachment features relating to respective downstream and upstream sides are now generally described with reference to FIGS. 7, 8(a) and 8(b). Referring first to FIG. 7, the upstream side of the processing module 80 is provided with three (3) captured fasteners 85 extending outwardly from vertically disposed lateral wall surfaces 84(a) and 84(b). Two of these fasteners 85(a), 85(b) are provided at the front of the first processing module 80 and extend from wall surface 84(a) with the third fastener 85(c) being provided in the lower rear portion of wall surface 84(b). A pair of engagement pins 87(a) and 87(b) are further retained by the upstream side walls 84(a) and 84(b) and also outwardly extend therefrom. According to this embodiment, one of the engagement pins 87(a) is disposed between the two front fasteners 85(a), 85(b) and the remaining engagement pin 87(b) is disposed adjacent the third fastener 85(c). A pinned electrical connector 91 extends outwardly from the lower part of side wall 84(b) of the upstream side of the processing module 80 adjacent the fastener 85(c) and engagement pin 87(b).

Referring to FIGS. 8(a) and 8(b), the downstream side of the base member 30 and more specifically the interface wall 37 includes a plurality of tapped engagement holes 89(a), 89(b), 89(c) that are positioned and sized to receive the fasteners 85(a), 85(b) and 85(c), as well as a pair of corresponding openings 89(d) and 89(e) that are each positioned and sized to receive the engagement pins 87(a) and 87(b), respectively. An elongate slot 71 permits access to a contained electrical connector 69.

In terms of attachment, the engagement pins 87(a), 87(b) are sized to extend outwardly by a longer axial length as compared with the captured fasteners 85(a), 85(b), 85(c) and extending electrical connector 91. As a result, the engagement pins 87(a) and 87(b) are initially aligned and engaged with the interface wall 37 of the base member. As shown in FIG. 8(b), the engagement opening 89(e) of the interface wall 37 of the base member 30 is slotted to provide additional adjustability in initially aligning the modular components wherein the combination of fasteners, engagement pins and wall surfaces provide exact constraint in terms of x, y and z alignment and in terms of pitch, roll and yaw. More specifically and referring to FIGS. 7, 8(a) and 8(b), the three captured fasteners 85(a), 85(b), 85(c) hold the upstream and downstream plates together. This constrains the Z axis direction as well as roll and yaw relationships therebetween. The front fasteners 85(a), 85(b) dominate this relationship. The rear fastener 85(c) keeps the connected modules 30, 80 from being damaged when large forces act to pull them apart. The front engagement pin hole 89(d) sets the X-Y relative positions between the two modules while the slotted engagement hole 89(e) sets the remaining degree of freedom, the pitch. This latter hole 89(e) is slotted so it does not force the modules 30, 80 into movement in either the X or Y direction and controls only the rotation about the first engagement pin 87(a). Finally, the extending electrical connector 91 is configured to engage the electrical connector 69, accessible through the interface wall 37 of the base member 30 through the elongate slot 71.

Though exact constraint is realized according to the present arrangement, the overall number and distribution of these pins/openings can be suitably varied provided that any variations are common to each processing module and the base member 30. In fact and referring to FIG. 8(a), the location of the tapped holes 89(b) can also vary depending on the location of the captured fasteners. The top cover 88, FIG. 15(b), can be hingably attached in order to provide access to the interior of the module 80, as needed. As shown in FIG. 15(b), for example, at least a section of the top cover 88 can be lifted to provide access to the front portion of at least one processing module(s).

Referring to FIG. 7, the first processing module 80 contains a plurality of components (these components being shown schematically in FIG. 6), including a wire or tube feeder assembly 92 having a set of rotating feed wheels or rollers 94. A module interconnect card 93 is attached to the top surface of the horizontal base plate 90 and is further attached to the electrical connector 91 as well as a corresponding electrical connector 81, FIG. 7, the latter connector being accessible through a slot provided in the upstream side wall 86. The interconnect card includes processing logic for communicating with the contained functional components of the module 80, including the elements of the retained feeder assembly 92 through a resident controller 96. The interconnect card 93 of this processing module 80 is further used to control a cooling fan 95 that is used to cool the stepper motors of the overall connected system of this embodiment. The fan 95, however, could be alternatively disposed in any of the processing modules or within the hollow interior 34, FIG. 5, of the base member 30. This specific embodiment provides a substantially centralized positioning for the cooling fan 95 that enables cooling of adjacent components. A safety or guard switch 97 is also provided to sense the opening of hinged covers of the modules and to cause the stoppage of the system automatically when the covers are opened. In one exemplary version, the guard switch 97 is a reed switch that senses the presence of a magnetic field. For purposes of this detection, a magnet (not shown) can be provided on the hinged door. When the door is opened, the magnet is caused to move away from the reed switch, which opens contacts on the switch, disabling operation automatically. According to this embodiment, a power switch 98 (shown schematically in FIG. 7) of this processing module 80 is further interconnected to the module interconnect card 93 wherein the lack of presence of an end cover 160 will prevent this specific module from functioning by disabling the power switch 98.

In terms of operation, sections of wire or tubing shown schematically in FIG. 6, are transferred from the base member 30, FIG. 3(a) along a linear product path 96 extending through openings in the base member, through an entrance opening formed within a bushing 83 supported by the feeder frame 92 that is inserted within an opening 85 in the side wall 84 axially aligned with the openings 54, 57 of the base member 30 in which the sections of wire pass between the feed rollers 94 that drive the wire or tube towards an exit opening 89(f) formed in the downstream side wall 86.

The opposing side wall 86 on the downstream side of the herein described processing module 80, as well as those also commonly provided on the downstream side of each of the other processing modules 100, 130, 140 includes a set of engagement holes, FIG. 8(a), 8(b) having a size and spacing pattern similar to those provided on the interface wall 37 of the base member 30, as well as the accessible electrical connector 81 via an elongated slot 71. The foregoing permits the releasable connection of another processing module 100, 130, 140 in serial fashion as discussed herein. According to this embodiment, each processing module further commonly includes a module specific interconnect card as discussed herein, beginning with the module 60, enabling control of resident components of each module as well as communication of power and logic signals between connected (including intermediate) processing modules and the base member 30. Though having different processing logic, the interconnect cards of each processing module are commonly linked to the electrical connectors extending from the opposing side walls and thereby permit a "composite" or integrated interconnect card to be created upon connection between any suitable number of the herein described processing modules and the base member 30.

Figure 9:
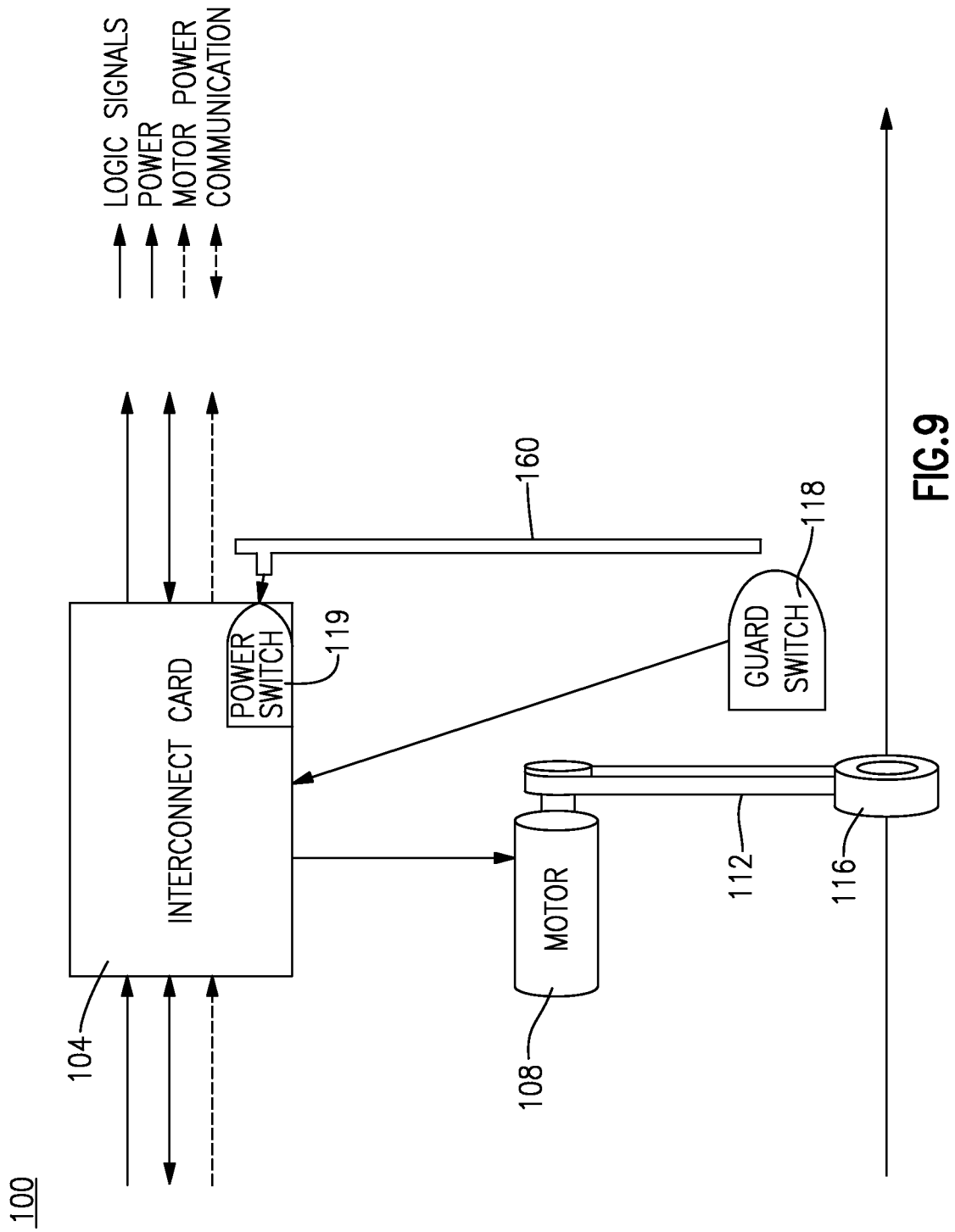
FIG. 9 is a functional schematic diagram of another wire or tubular component processing module used in the apparatus of FIGS. 1-6.
Figure 10:
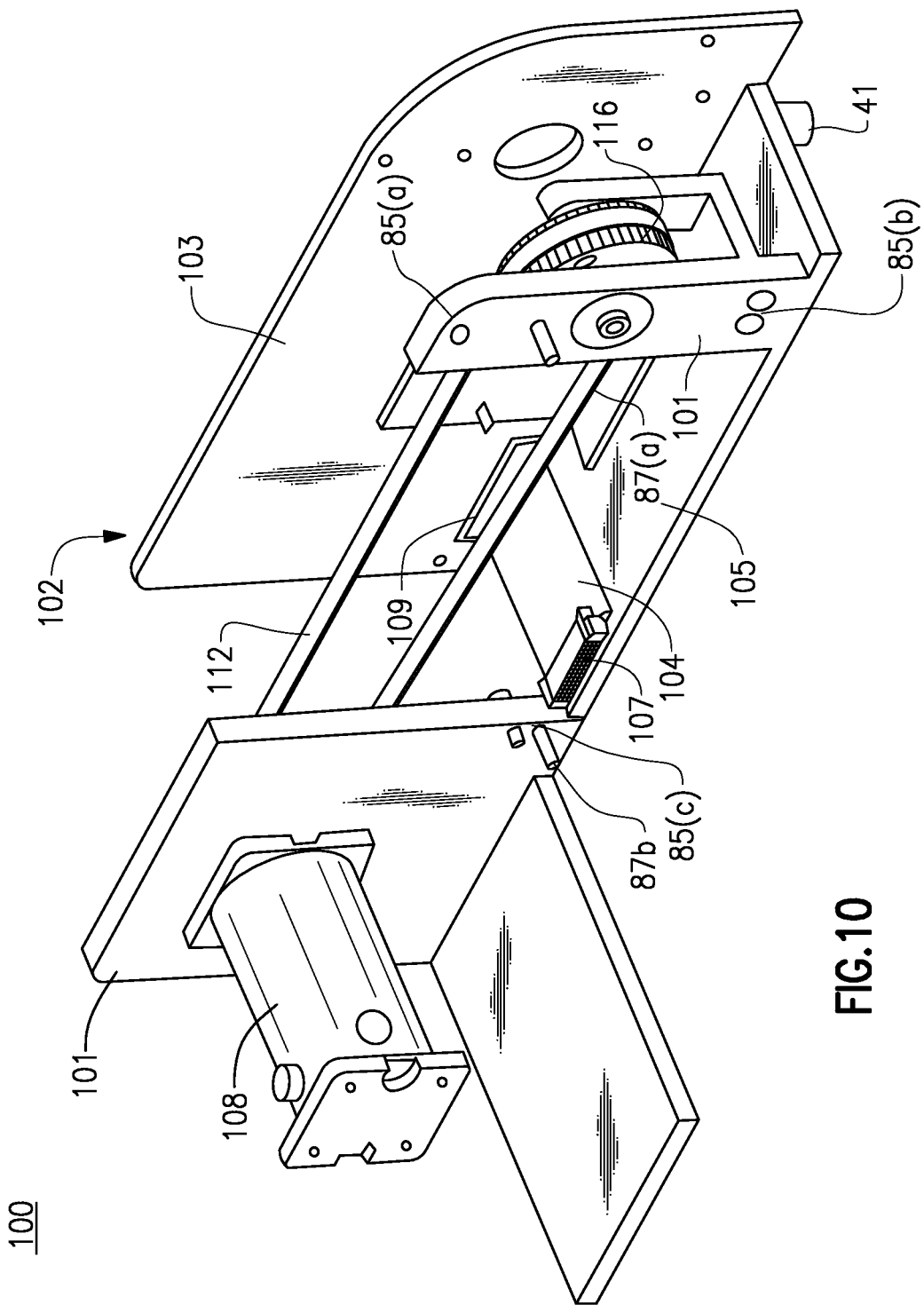
FIG. 10 is a partial side perspective view, partially broken away of the wire or tubular component processing module shown in FIG. 9.

Based on the foregoing summary and referring to FIG. 9, a schematic diagram is depicted of a second wire or tube processing module 100, which according to this exemplary embodiment is represented by a wheel cutting module. The components of one version of this processing module 100 are shown in the partially broken away view according to FIG. 10. The module 100 according to this embodiment is defined by a module housing 102 including a first upstream side wall or side plate 101, a second downstream side wall or side plate 103 extending vertically and disposed between a planar base or supporting plate 105, and a top cover (not shown). The supporting plate 90 includes a bottom surface that retains a plurality of supporting feet 41 on respective corners wherein the interior of the module is sized to retain a plurality of components. More specifically, a module interconnect card 104 is attached to the top surface of the base plate 105, the interconnect card being configured/ programmed with sufficient logic to operate a motor 108 that drives a serpentine drive belt 112 linked to a rotating wheel 116 having a contained cutting blade (not shown) used for cutting specific sized sections of material. According to this version, the motor 108 is mounted through the upstream side wall 101 and an extending portion of the motor housing extends transversely from the side wall, thereby creating a substantially L-shaped configuration as more clearly shown in FIGS. 1 and 10. Electrical connectors 107, 109 are attached to the interconnect card 104 on opposing sides thereof, the connectors being positioned within openings provided in the side walls 101, 103, respectively. The motor 108 is enabled by means of the interconnect card 104, as well as the controller 75 that is provided in the base member 30, when the second processing module 100 is connected. Depending on the specific product that can be fitted through the largest bushing thereof, either a small or a large wheel cutter module, shown as module 130 or both can be provided. The output of a guard switch 118 is fed as an input to the interconnect card 104, in order to automatically terminate power if the hinged access door is opened. Similarly to the processing module 80, a power switch 119 (shown schematically) of this module 100 is also enabled only if an end wall or cover 160 is set in place relative to the second side wall 103 and the exposed electrical connector 109.

As in the preceding, the first side wall 101 at the upstream side of the module 100 includes a set of captured fasteners 85(a), 85(b), 85(c) as well as a pair of spaced apart engagement pins 87a, 87b that are positioned to engage either the openings 40 in the interface wall 37 of the base member 30 or according to this embodiment, the engagement openings 89 formed in the downstream side wall 86 of the processing module 80 and in which exact constraint is realized between interconnected processing modules.

Figure 11:
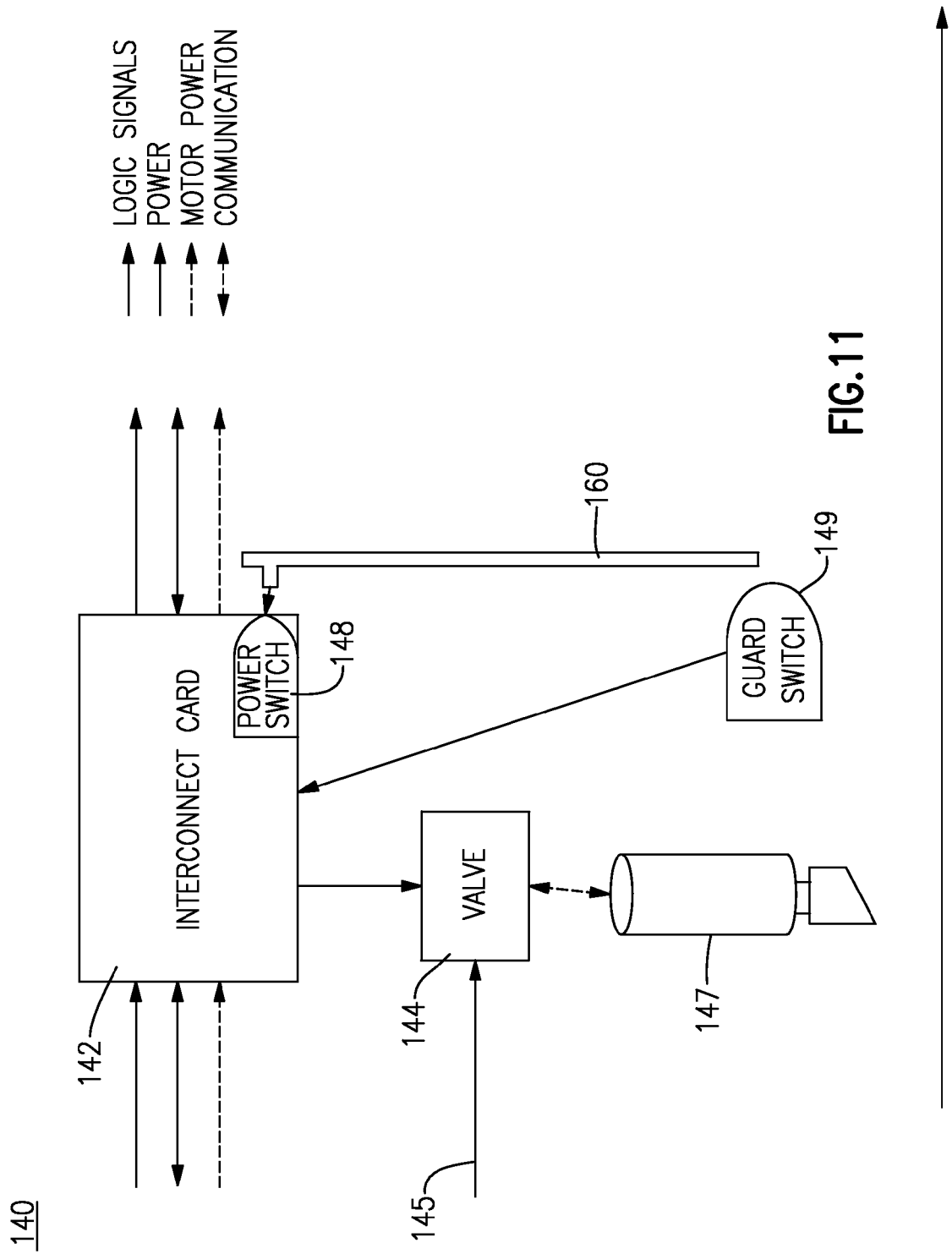
FIG. 11 is a functional schematic diagram of another wire or tubular component processing module used in the apparatus of FIGS. 1-6.
Figure 12:
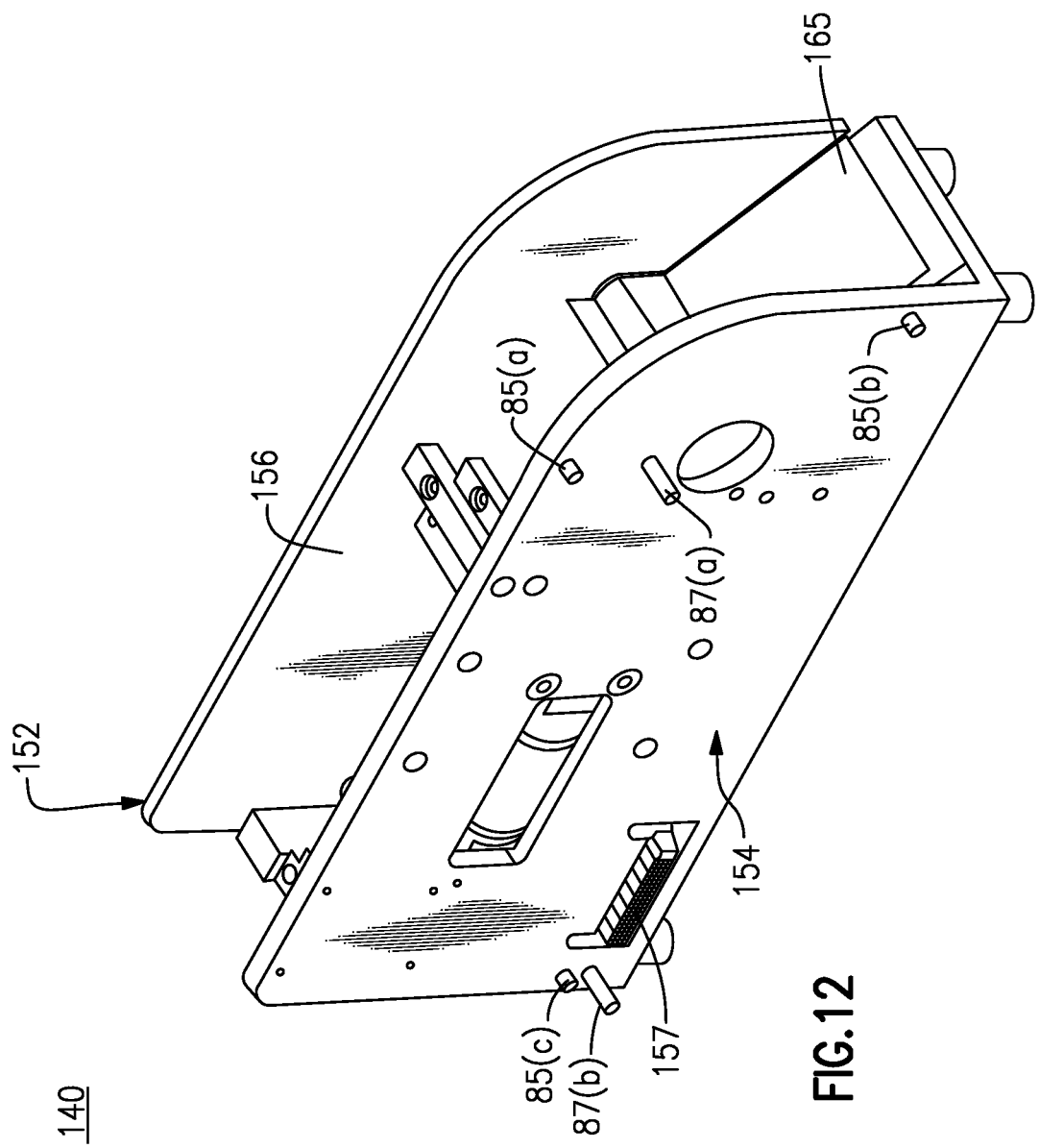
FIG. 12 is a partial side perspective view, partially broken away, of the wire or tubular component processing module of FIG. 11.

Referring to FIG. 11, a schematic diagram is provided for an exemplary and interchangeable cutting module for purposes of this embodiment and in particular schematically depicting a guillotine cutter module 140. The actual components of this module are shown in greater detail in the broken away view according to FIG. 12. In this processing module 140, a contained module interconnect card 142 is configured to operate a valve 144 that is fed by means of an exterior air supply, represented by reference arrow 145. The valve 144 is used to operate a reciprocating cutter blade assembly 147 or guillotine employed for cutting sections of wire or tube of predetermined length that are fed, for example from the feeder module 80, synchronously. A guard switch 149 provides logic signals to the interconnect card 142 in the event the hinged access door is opened. Adjacent the cutter blade assembly 147 at the front of the module 140 is a chute 165.

Also and as common to the preceding described processing modules 80, 100, 130, this module 140 is also defined by a housing 152 that further defines an interior sized to retain the above-noted components. A first upstream side wall 152 and a second downstream side wall 156 are bridged by a base or supporting plate (not shown) and a top cover (not shown). The module interconnect card 142 is retained within the housing 152 and is attached to the top surface of the base plate wherein a pair of electrical connectors extend through openings formed in the sidewalls 154, 156. Only the upstream side connector 157 is shown in this view. Also and as in the preceding, engagement pins 87a, 87b and captured fasteners 85(a), 85(b) and 85(c) extend outwardly from the side wall 154 with engagement openings (not shown) being provided in the side wall 156. In this module, the position of the fastener 85(b) is slightly forward of fastener 85(a).

According to this version and as in the prior described processing modules, a power switch 148 of this processing module 140 is not enabled unless the end cover 160 is first positioned to cover the exposed side wall 156.

In summary, each of the wire or tube processing modules 80, 100, 130, 140 are enabled by means of the contained interconnect cards and electrical connectors to communicate power and logic signals along a path that is created between the various processing modules 80, 100, 130, 140 and the base member 30, thereby effectively creating a composite interconnect card when the module components of the apparatus 20 are mated.

Figure 13:
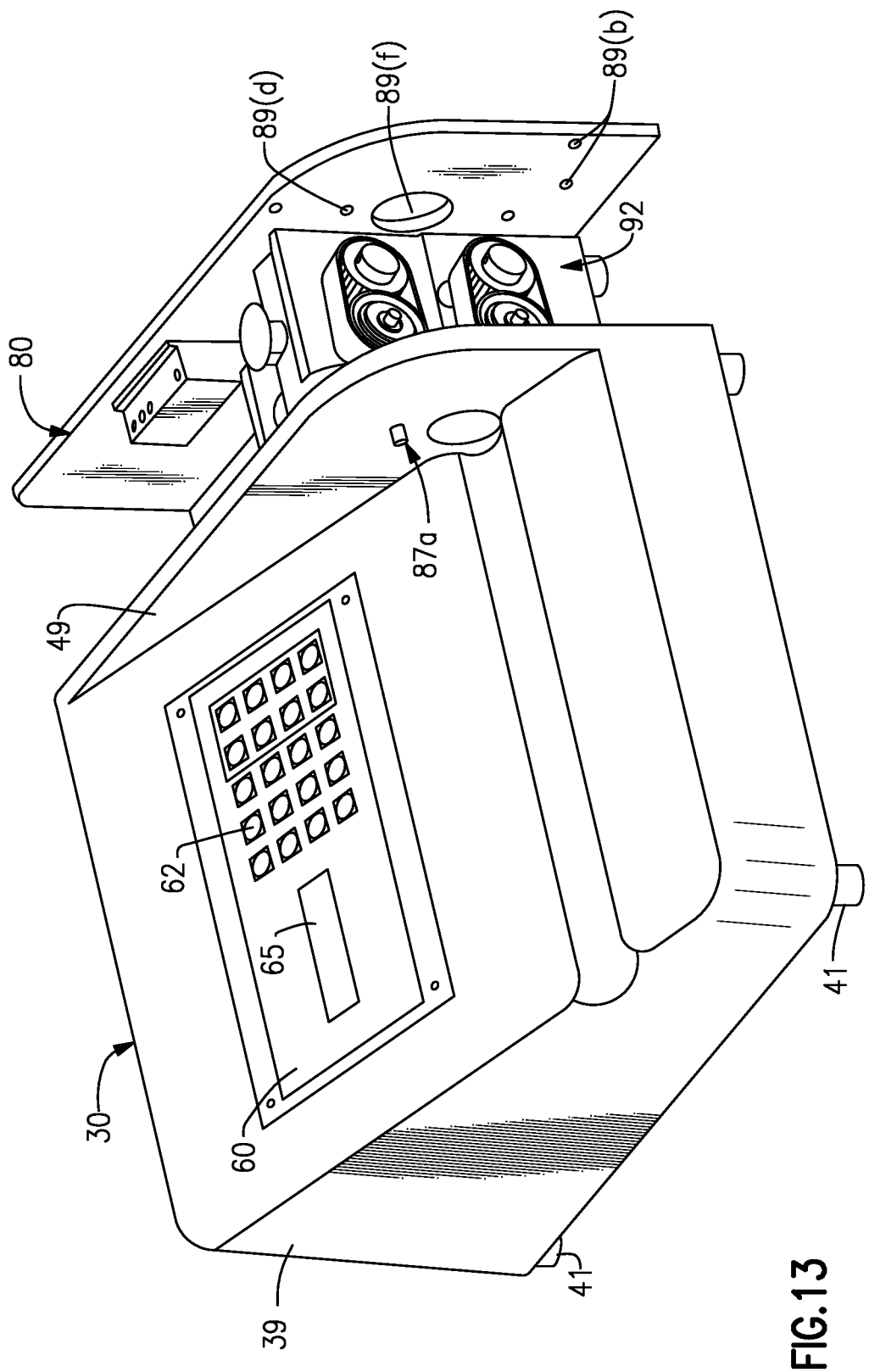
FIG. 13 is a front perspective view, partially broken away, of the base member as attached to a wire or tubular processing module.

As shown in FIG. 13, the first wire or tubular component module 80 is shown attached to the base member 30. The engagement holes 40 of the base member 30 releasably retain the laterally extending engagement pins 87 (only engagement pin 87a is shown in this view) of the wire feeding assembly 80 in which each of the electrical connectors provided on the interface wall 37 of the base member 30 and the first side wall 84 of the module 80 are also engaged. In one version, the engagement pins 87 can be tapered at their extending end to insure alignment. As noted, the engagement pins are longer than the captured fasteners. As a result, initial alignment is achieved between interconnected modules of this assembly using the engagement pins, followed by the captured fasteners which aids in properly aligning the electrical connectors prior to mating.

Access to the captured fasteners 85(a), 85(b), 85(c) can be provided using access holes provided in the downstream side walls of the upstream processing modules. Examples are shown in FIGS. 14(a) and 14(b) for a feeder module 80(a) and a large wheel cutter module 120(a); respectively.

In the feeder assembly 80(a), an opening is provided in the downstream side wall 86 to enable access to the fastener 85(b). In the wheel cutter module 120(a), a similar access hole 135 is provided in a downstream side wall 133 to enable the placement of an allen wrench that can access the head of the captured fastener 85(b), which is disposed within recessed mounting portion on the interior side of the upstream side wall 131. Similar openings can be provided in which the module 130(a) can, for example, be attached to the side wall of module 80(a).

An exemplary arrangement/configuration of this apparatus is depicted in FIGS. 15(a)-16(b). An apparatus 20a includes a base member 30 that is releasably attached to a feeder module 80 and a belt (wheel) cutter module 100.

In each of the foregoing, the various interconnect cards contained in the base member 30 and each connected processing module(s) 80, 100 and 140 are linked to one another when the modules are attached to one another. More specifically, the laterally extending engagement pins 87(a), 87(b) of the feeder module 80 engage the sized engagement holes 89(d), 89(e) that are provided on the interface wall 37 of the base member 30 and provide a stable platform as previously discussed. The cutter module 100 is then further attached in the preceding manner to the feeder module 80 wherein the engagement pins 87(a), 87(b) of the upstream side wall 84 of the cutter module 100 are engaged with the engagement holes 89(d), 89(e) formed on the downstream side wall 86 of the feeder module 80 and in which the electrical connectors of each module are also mated to one another. However, it will be readily apparent that a myriad of other configurations could be created, depending on the application.

The interconnect cards of each attached wire or tube processing module are linked to the interconnect card 63 of the base member 30 by means of the pinned electrical connection, thereby establishing a composite or modular processing board with appropriate logic and power signals being communicated to each operable component in each processing module once programmed at the user's interface 60 of the base member 30.

In this embodiment, the feeder module 80 is connected to the base member 30 and the cutter assembly 100 is selectively attached to the feeder module 80. Electrical and mechanical interconnection is provided for operating and powering each module from the base member 30 using the operator's interface 60, thereby providing enhanced versatility and capability.

The attachment of the separate processing modules 80, 100 and 140 further creates an aligned single product path from the base member 80 through each of the attached processing modules. More specifically, the product path created extends through the formed openings in each module in which a wire or tubular product is fed between the feed rollers 94 of the feeder module 80 and subsequently through the rotating cutter wheel 116 of module 100.

Referring to FIGS. 17(a) and 17(b), the apparatus 20 is provided with an end cover 160 that is sized and shaped to cover the interface wall 37 of the base member 30 as well as each of the downstream side walls of the herein described processing modules. The end plate 160 includes an opening 164 that is aligned with the feed opening and alignment trough 51 of the base member 30, the end plate further covering the exposed electrical connector 69 and elongated slot 71.

Referring to FIGS. 18(a) and 18(b), the end plate 160 can be removed from the base member 30 prior to attaching a processing module 80, wherein the end plate can be separately and releasably attached to the last connected processing module of the apparatus 20. As depicted in this specific example, the end plate 160 is sized to cover the exposed side wall 86, FIG. 7, of the first processing module 80 following connection of same to the base member 30. According to at least one version, the processing module 80 cannot be powered until either the end cover 160 or another processing module (80 is attached thereto. In the latter instance, processing module 80 would not be powered until the end plate 160 is attached thereto by means of fasteners or retaining bolts to the exposed side wall 86, the end plate having a mechanical feature that enables the power switch 119 of this module as previously shown and described according to FIG. 9 and providing a suitable safety feature.

Figure 20:
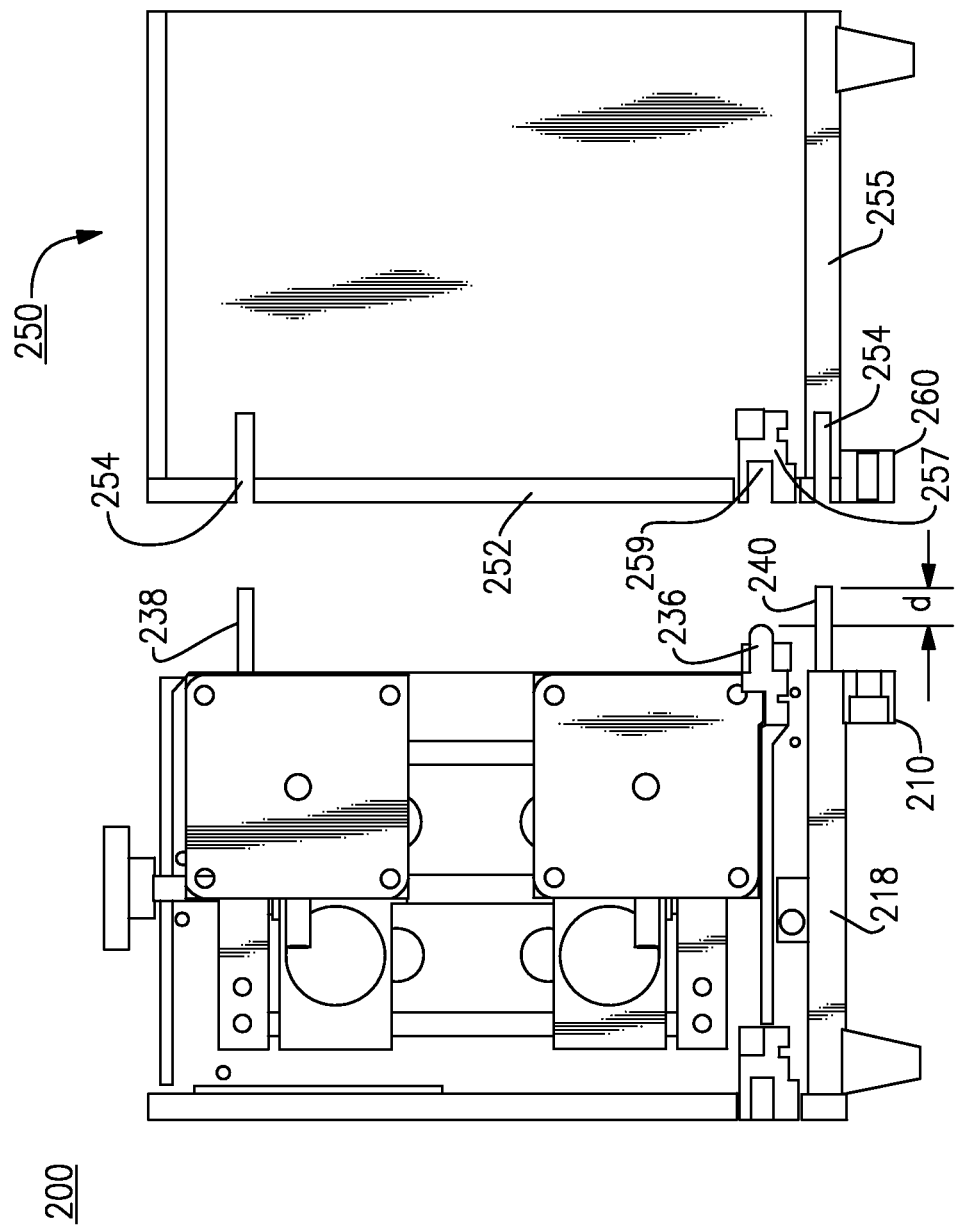
FIG. 20 is a side elevational view, partially in section, illustrating the interconnectivity between processing modules having the mechanical interface of FIG. 19.

Alternative mounting arrangements for the various processing modules can be contemplated for the various processing modules that embody the concepts described herein. For example and referring to FIGS. 19 and 20, the use of side walls or plates on the upstream side of at least one processing module 200 (in this example, a feeder processing module) can be obviated. In this "one wall" module design, a pair of spaced mounting blocks 210, 214 are fixedly mounted to the underside of a base or supporting plate 218 and in which a third mounting block 222 is attached to the feeder frame 230 at the front of the module 200. Each of the mounting blocks 210, 214, 222 are configured to retain a fastener 234 (shown only in FIG. 20) wherein the fasteners are similar in design to those previously described herein. Engagement pins 238, 240, also similar to those previously described, are also provided in this design but in which the pins are alternatively retained within the feeder frame 230 and the supporting plate 218, respectively, due to the absence of an upstream side wall. Preferably, the engagement pins 238, 240 are longer than the fasteners 230 as shown by -d- to enable their engagement within respective openings 254 in the side wall 252 and supporting plate of a connected processing module 250 prior to receipt of the fasteners within corresponding mounting blocks 260. As a result of the above, exact constraint is still realized according to this design. Moreover and following mechanical alignment, an extending electrical connector 236 can be engaged with a mating connector 257 accessible within a slot 259 provided in the side wall of the connected module 250.

Figure 21:
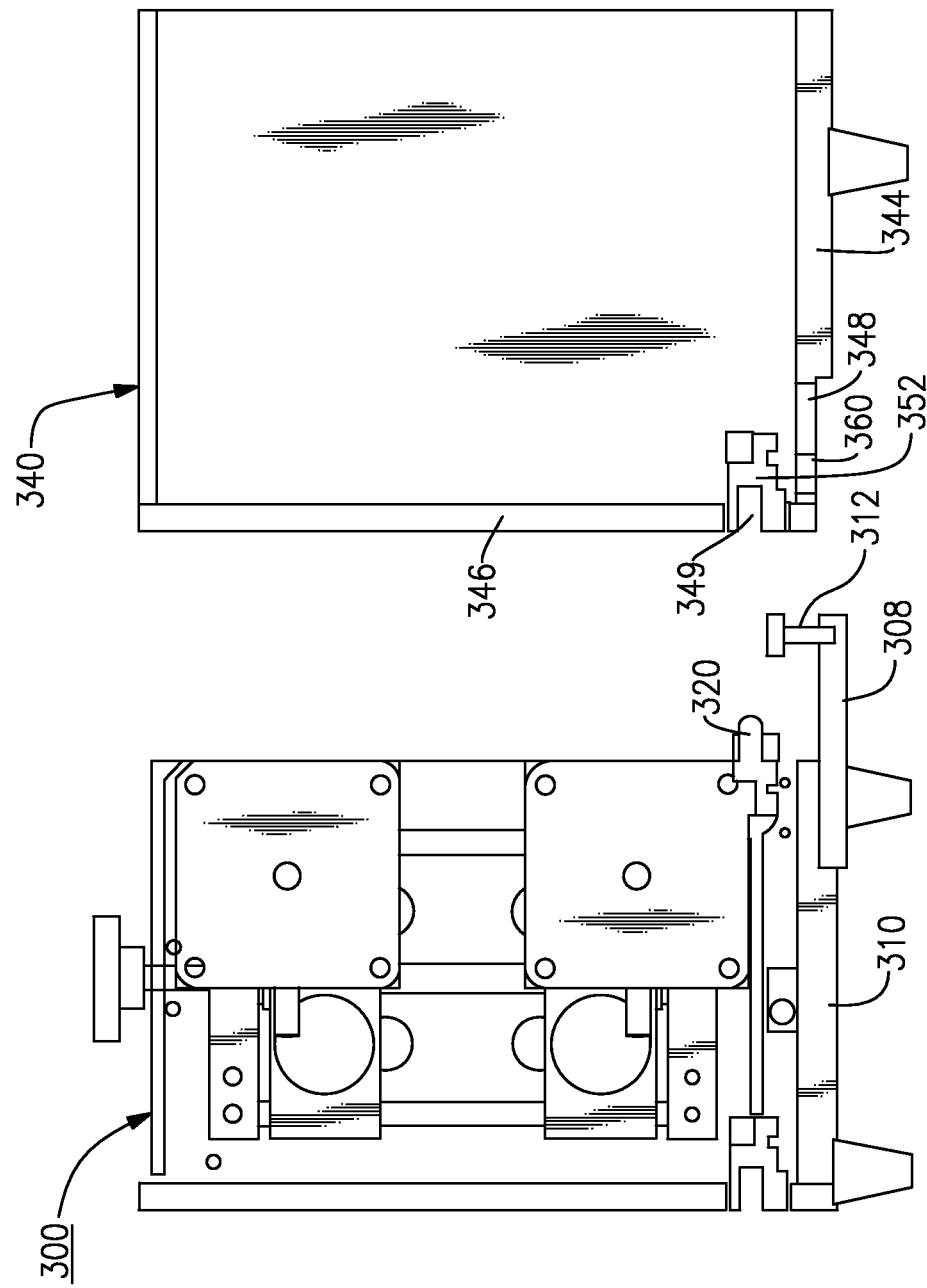
FIG. 21 is a side elevational view, partially in section, depicting the interconnectivity between processing modules in accordance with another exemplary mechanical interface and prior to interconnection.
Figure 22:
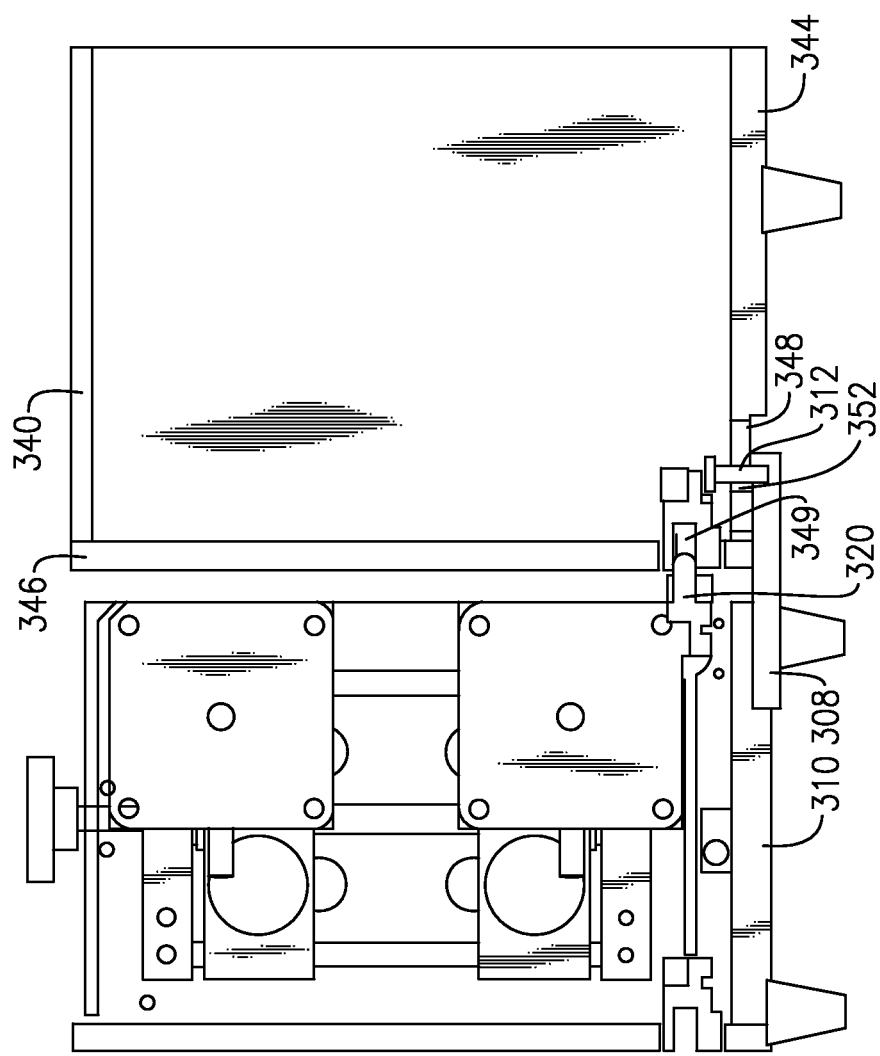
FIG. 22 is a side elevational view of the processing modules of FIG. 21, illustrating an intermediate interconnection therebetween.
Figure 23:
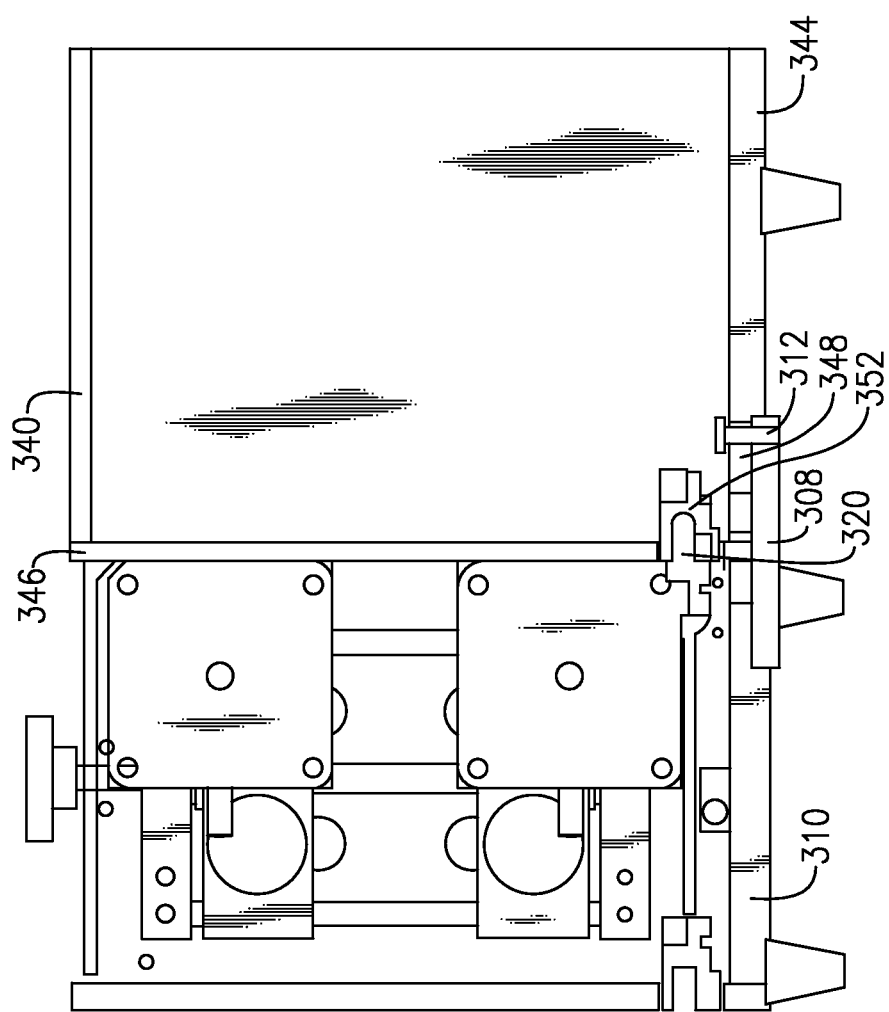
FIG. 23 is a side elevational view of the processing modules of FIGS. 21 and 22, illustrating a complete interconnection.

Another alternative mounting design is depicted in FIGS. 21-24. In FIGS. 21-23, a pair of processing modules 300, 340 are shown in side by side relation for purposes of connection. Each of the processing modules 300, 340 are analogous to those previously described as well in terms of their functionality, in which each retain various structural components as well as processing logic for enabling the operation of the contained components and in which an upstream side of module 340 is engaged with the downstream side of processing module 300. In lieu of captured fasteners as previously discussed and according to this alternative embodiment, the lower horizontal supporting plate 310 of the first processing module 300 is provided with an axially extending section 308 on the downstream side thereof having disposed thereon at least one threaded fastener 312 that is vertically mounted within an opening 316 provided at the distal end of the section with the head of the fastener and an axial portion of the shank of the fastener initially extending upwardly therefrom. The adjacent or second processing module 340 also includes a base or supporting plate 344 which is substantially coplanar with that of the first processing module 300 and in which this latter plate has a reduced thickness over an axial portion 348 on the upstream side thereof. The supporting plate 344 further includes a slotted opening or keyway 360 formed in the reduced thickness section 348 and shown in greater detail in FIG. 24.

Figure 24:
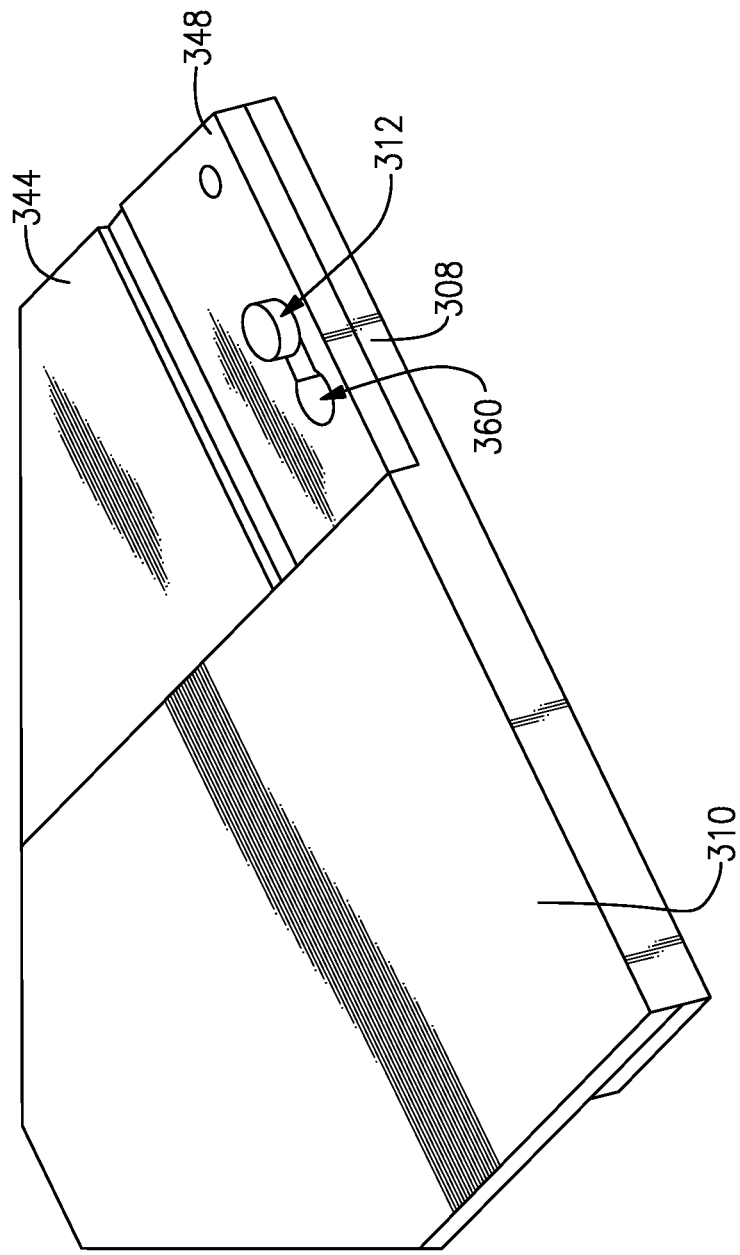
FIG. 24 is a partial top perspective view of a portion of the processing modules of FIGS. 21-23, depicting aspects of the mechanical interface.

As shown in FIGS. 21-23, the processing modules 300, 340 are brought into contact wherein the head of the extending fastener 312 being extended upwardly into the opening of the horizontal mounting plate 344 of the adjacent module 340. In this position, the modules 300, 340 are initially aligned with one another such that an electrical connector 320 extending from the first processing module 300 extends into a slotted region 348 of the mounting plate 344 and accessing a corresponding pinned connector 352 of the adjacent second module 340. As shown in FIGS. 23 and 24, the modules are moved towards each other, advancing the fastener into the slotted portion and mating the connectors 320, 352 of the respective modules.

Yet another alternative design is illustrated in FIGS. 25(a)-26(c). In this latter version, a base member 30(a) similar to those previously discussed is provided with an adjustable rail structure 418 that is used to retain one or two processing modules 460, 480. More specifically, the underside of a supporting plate 36(a) of the base member 30(a) is provided with a set of axial slots 424 that retain parallel spaced rail sections 428 of the structure 418, the structure further including an L-shaped end section 430. The rail sections 428 can be selectively retracted in a direction from the upstream wall 37(a) into the relative positions shown in FIGS. 25(a) and 25(b).

In operation, one or two modules can be selectively engaged within the space defined by the end portion 430 and rail sections 428 relative to modules 80 and 100, respectively, and as shown pictorially in FIGS. 26(a)-(c).

Figure 27:
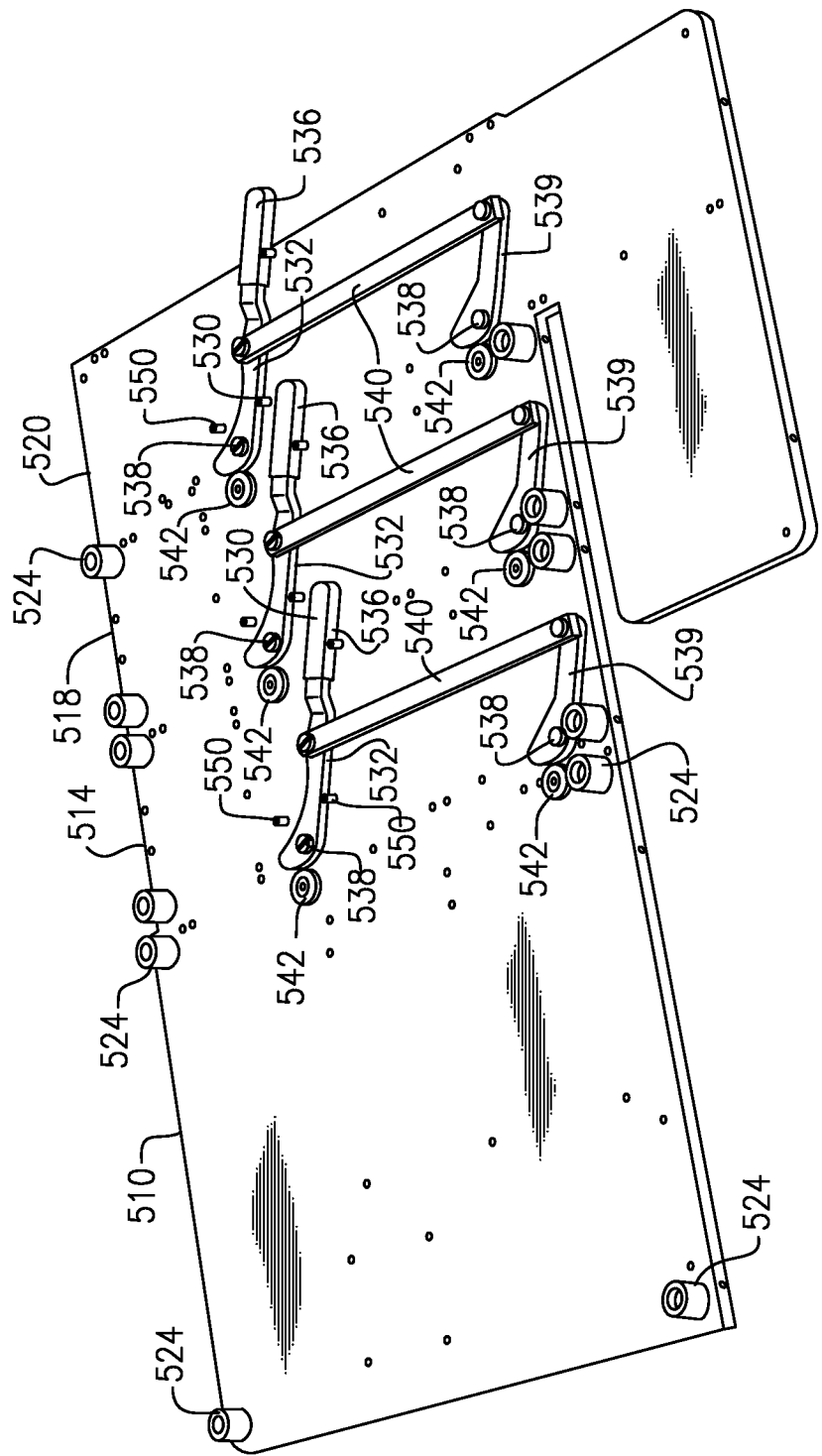
FIG. 27 is a partial bottom perspective view of the bottom of a modular processing apparatus having a release mechanism in accordance with one embodiment.

Referring to FIG. 27 and according to another version, the herein described modular processing apparatus can be further equipped with a release mechanism to facilitate removal of any or all of the described processing modules, particularly as to the mating electrical connectors.

The release mechanism according to this version comprises a plurality of release levers 530 that are mounted to the underside of the base or supporting plates 514, 518, 520 of each of the processing modules. The release levers 530 is defined by an outwardly extending or engagement portion 536 on one end and a cam member 532 on the opposing end. The release lever 530 is further attached at an intermediate portion thereof to one end of a transverse member 540 in which the remaining end of the transverse member is also attached to a cam member 539, the latter member being parallel to cam member 532 and spaced therefrom by a fixed distance due to the span of the transverse member 540. The transverse member 540 is fixedly attached to the release lever 530 and one end of the cam member 539 using fasteners or alternatively these components can be fabricated as an integral subassembly.

The cam members 532 and 539 are attached to the underside of each respective supporting plate 514, 518, 520 using fasteners 538 in which the cam members are pivotally movable about their attachment point. A pair of stop pins 550 are provided on opposing sides of at least one cam member 532 to define an overall length of travel for the release lever 530, as described below. The distal end of the cam members 532, 539 are curved to define a cam structure that are disposed upon rotation of the release lever 530 to engage a corresponding engagement member 542, the latter member being a rigid circular component that is fixedly attached to the underside of the base plates 510, 514, 518 of the base member and the processing modules, respectively. Each of the foregoing assemblies as noted are disposed on the underside of the modular processing apparatus, but in a manner that does not interfere with the support of the apparatus on the rubberized support feet 524.

In operation and assuming that a plurality of processing modules have already been attached to the base member and one another in the manner described in accordance, for example, with that previously described and shown in FIGS. 1-18 with the electrical connectors (not shown in this view), fasteners and engagement pins engaged. The captured fasteners interconnecting the modules are initially loosened and then one of the release levers 530 are engaged by gripping of the engagement portion 536 of the lever and moving same in a counterclockwise direction according to this embodiment. This movement causes each of the cam members 532 and 539, due to their fixed attachment to the transverse member 540, to rotate counterclockwise about their respective attachment points and engage the widened cam portions thereof against the exterior of the stop members 542. This engagement creates a pushing force therebetween that forces separation of the modules, now held only by the engagement pins and the pinned electrical connectors between respective upstream and downstream sides. As noted, movement of the release levers 530 are preferably restricted by the stop pins 550, in which a fairly short range of motion/rotation is all that is required to facilitate release of the modules from the herein described apparatus.

PARTS LIST FOR FIGS. 1-27

20 apparatus, modular tubular component or wire processing
20a apparatus
30 base member
30(a) base member
32 compact housing
33 controller
34 hollow interior
36 base or supporting plate
36(a) base or supporting plate
37 interface wall
39 cover
40 engagement holes
41 rubberized feet
43 front facing wall
45 first side wall
47 rear wall
48 top surface
49 second side wall
51 alignment trough
52 actuable operating switch
53 reference arrow
54 opening
56 extending portion
57 opening
58 power entry module
59 port
60 operator's interface
61 transformer, AC
62 control buttons, actuable
63 interconnect card
65 display
67 interface controller
68 emergency stop button
69 connector
71 elongated slot
73 sensor, out of stock
75 cutter motor controller
80 first wire processing module 82 module housing
83 bushing
84(a) side wall
84(b) side wall
85(a) fastener
85(b) fastener
85(c) fastener
86 side wall
87a engagement pin
87b engagement pin
88 top cover
89(a) engagement holes
89(b) engagement holes
89(c) engagement holes
89(d) engagement holes
89(e) engagement holes
90 base or supporting plate
91 connector
92 feeder assembly
93 interconnect card
94 feed rollers
95 cooling fan
96 feeder controller
97 guard switch
98 power switch
99 opening, access
100 second wire processing module
101 side wall
102 module housing
103 side wall
104 interconnect card
105 supporting or base plate
108 motor
112 drive belt
116 rotating wheel
118 guard switch
119 power switch
130 third wire or tube processing module
131 side wall
133 side wall
135 access opening
137 allen wrench
140 fourth wire or tube processing module
142 interconnect card
144 valve
145 air supply, exterior
147 cutter blade assembly
148 power switch
149 guard switch
151 arrow
152 housing
154 first side wall
156 second side wall
157 electrical connector
160 end plate
165 chute
200 apparatus
210 mounting block
214 mounting block
218 supporting plate
222 mounting block
230 feeder frame
236 electrical connector
238 engagement pin
240 engagement pin
250 processing module
254 openings
255 supporting plate
257 electrical connector
259 slotted portion
260 mounting blocks
300 processing module
308 extending section
310 base or supporting plate
312 threaded fastener
316 opening
320 electrical connector
340 processing module
344 supporting plate
346 side wall
348 axial portion
349 slotted portion
352 electrical connector
360 opening, slotted, keyway
400 apparatus
410 base member
420 supporting plate
424 axial slots
428 rail sections
510 base or supporting plate
514 base or supporting plate
518 base or supporting plate
520 base or supporting plate
524 support feet
530 release lever
532 cam member
536 extending portion
538 fasteners
539 cam member
540 transverse member
550 stop pins It will be readily apparent that various modifications and variations are possible within the intended ambits of the inventive concepts discussed herein, and as recited according to the following claims. For example and in another version, the base member and feeder assembly can be integrated in which the remaining processing modules can be releasably appended in interchangeable fashion as previously described. The latter provides a manual option depending on the amount of material using a feeder assembly only with an automated option available for additional processing.

The invention claimed is:
1. A modular material processing apparatus comprising:
a) a base member comprising:
a housing having a cover, a plurality of side walls, and a supporting plate defining an enclosed interior;
a microprocessor and a transformer each retained within the enclosed interior of the base member, the transformer being configured for connection with an exterior power source;
an operator's interface disposed on the cover of the base member; and
an electrical connector disposed in one of the side walls of the base member; and
b) a plurality of material processing modules, each module comprising:
a module housing defined by a supporting plate, a cover, and parallel side walls defining an interior,
a feed opening defined in each of the parallel side walls of the module housing; and
an electrical connector defined in at least one side wall of the module housing, in which one said material processing module is directly and releasably coupled to the base member such that when coupled, one side wall of the base member and one of the parallel side walls of the coupled material processing module are mechanically and releasably linked in intimate contact with one another in a serial configuration and in which each of the electrical connectors of the base member and the material processing module are mated to one another with the operator's interface being configured to selectively enable processing features in the coupled material processing module and in which any remaining number of the plurality of material processing modules are individually, mechanically and electrically linked to the serial configuration with the side walls of each of the linked material processing modules being placed in intimate contact and wherein the plurality of material processing modules individually provide processing functions selected from the group of processing functions that include, cutting, feeding, coating, crimping, marking, splicing, coating removal, and reeling.

2. The modular apparatus as recited in claim 1, in which the plurality of said material processing modules are selectively and interchangeably connected to either the base member or each other in the serial configuration.

3. The modular apparatus as recited in claim 2, wherein one of said material processing modules is a rotary cutting module and another of said material processing modules is a guillotine cutting module.

4. The modular apparatus as recited in claim 1, further comprising a release mechanism for facilitating release of said each linked material processing module from said apparatus.

5. The modular apparatus as recited in claim 4, wherein said release mechanism comprises at least one release lever having a pivotally mounted opposing end, said opposing end having at least one cam structure that is configured to engage a fixed portion of an adjacent section of said apparatus when rotated in a predetermined direction.

6. The modular apparatus as recited in claim 1, further comprising at least one engagement member extending from the of each coupled material processing module for engaging an opening in a side wall of another said material processing module or the base member.

7. The apparatus as recited in claim 1, wherein said material handled by the apparatus is at least one of wire or tubing.

* * * * *

UNITED STATES PATENT AND TRADEMARK OFFICE
CERTIFICATE OF CORRECTION

PATENT NO. : 9,597,763 B2
APPLICATION NO. : 13/469753
DATED : March 21, 2017
INVENTOR(S) : Richard A. DePaulis et al.

It is certified that error appears in the above-identified patent and that said Letters Patent is hereby corrected as shown below:

Correction of Claim 6 is requested as follows:
Column 20
Line 17, delete "the of"

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*